(12) United States Patent
Saito et al.

(10) Patent No.: US 11,188,793 B2
(45) Date of Patent: Nov. 30, 2021

(54) INFORMATION PROCESSING APPARATUS, INFORMATION PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Yuki Saito, Tokyo (JP); Yasuhiro Komori, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 5 days.

(21) Appl. No.: 16/193,747

(22) Filed: Nov. 16, 2018

(65) Prior Publication Data

US 2019/0156157 A1    May 23, 2019

(30) Foreign Application Priority Data

Nov. 21, 2017 (JP) .............................. JP2017-223929

(51) Int. Cl.
| | | |
|---|---|---|
| G06K 9/62 | (2006.01) | |
| G06T 7/11 | (2017.01) | |
| G06T 7/70 | (2017.01) | |
| G06K 9/00 | (2006.01) | |

(52) U.S. Cl.
CPC ....... *G06K 9/6262* (2013.01); *G06K 9/00275* (2013.01); *G06K 9/00369* (2013.01); *G06K 9/00375* (2013.01); *G06T 7/11* (2017.01); *G06T 7/70* (2017.01); *G06T 2207/20084* (2013.01)

(58) Field of Classification Search
CPC .............................. G06K 9/4628; G06N 3/08
USPC .... 382/103, 140, 165, 107, 199, 138; 482/8; 600/408
See application file for complete search history.

(56) References Cited

U.S. PATENT DOCUMENTS

| | | | | |
|---|---|---|---|---|
| 10,891,525 B1* | 1/2021 | Olgiati | ................... | G06T 9/002 |
| 2006/0247506 A1* | 11/2006 | Balberg | ............... | A61B 5/0097 |
| | | | | 600/323 |
| 2008/0008379 A1* | 1/2008 | Andel | .................. | G06K 9/2054 |
| | | | | 382/141 |

(Continued)

OTHER PUBLICATIONS

K. Simonyan, et al., Two-Stream Convolutional Networks for Action Recognition in Videos, Advances in Neural Information Processing Systems 27, NIPS, Dec. 2014.

(Continued)

*Primary Examiner* — Kiet M Doan
(74) *Attorney, Agent, or Firm* — Carter, DeLuca & Farrell LLP

(57) ABSTRACT

A result of recognition processing of a convolutional neural network is acquired using recognition object data including information of a recognition object, as an input. A region of interest for the recognition object data and/or an intermediate layer output of the convolutional neural network is set. Detail recognition processing is performed for the recognition object data and/or the intermediate layer output in the region of interest. Integration processing of a result of the detail recognition processing and the intermediate layer output is performed. A result of the integration processing is input as the intermediate layer output to the convolutional neural network. A result of the recognition processing is output.

22 Claims, 27 Drawing Sheets

(56) References Cited

U.S. PATENT DOCUMENTS

| | | | |
|---|---|---|---|
| 2014/0177946 A1* | 6/2014 | Lim | G06K 9/00369 |
| | | | 382/156 |
| 2016/0342863 A1* | 11/2016 | Kwon | G06K 9/4647 |
| 2016/0342865 A1* | 11/2016 | Tang | G06K 9/42 |
| 2017/0116498 A1* | 4/2017 | Raveane | G06N 3/10 |
| 2017/0300784 A1* | 10/2017 | Tang | G06K 9/42 |
| 2017/0345196 A1* | 11/2017 | Tanaka | G06T 5/50 |
| 2018/0061051 A1* | 3/2018 | Matsunaga | G06T 7/337 |

OTHER PUBLICATIONS

Guilhem Chéron, et al., P-CNN: Pose-based CNN Features for Action Recognition, ICCV, 2015.

H. Grabner, et al., Real-Time Tracking via On-line Boosting, Proceedings of the British Machine Conference, pp. 6.1-6.10. BMVA Press, Sep. 2006.

Shih-En Wei, et al., Convolutional Pose Machines, CVPR, 2016.

A. Krizhevsky et al., ImageNet Classification with Deep Convolutional Neural Networks,, Advances in Neural Information Processing Systems 25 (NIPS), 2012.

C. Feichtenhofer, et al., Spatiotemporal Residual Networks for Video Action Recognition, Advances in Neural Information Processing Systems (NIPS), 2016.

C. Feichtenhofer, et al., Spatiotemporal Multiplier Networks for Video Action Recognition, IEEE Conference on Computer Vision and Pattern Recognition (CVPR), 2017.

C. Feichtenhofer, et al., Convolutional Two-Stream Network Fusion for Video Action Recognition, IEEE Conference on Computer Vision and Pattern Recognition (CVPR), 2016.

S. Ren, et al., Faster R-CNN: Towards Real-Time Object Detection with Region Proposal Networks, Advances in Neural Information Processing Systems (NIPS), 2015.

K. He, et al., Identity Mappings in Deep Residual Networks, ECCV, 2016.

B. Singh, et al., , A Multi-Stream Bi-Directional Recurrent Neural Network for Fine-Grained Action Detection, CVPR, 2016.

M. Rohrbach, et al., A Database for Fine Grained Activity Detection of Cooking Activities, Computer Vision and Pattern Recognition (CVPR), 2012 IEEE Conference on Computer Vision and Pattern Recognition.

S. Ioffe, et al. Batch Normalization: Accelerating Deep Network Training by Reducing Internal Covariate Shift, JMLR.

* cited by examiner

FIG. 20
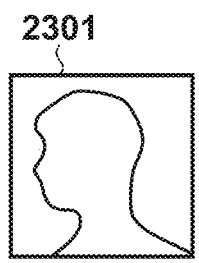
2301
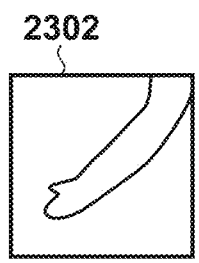
2302
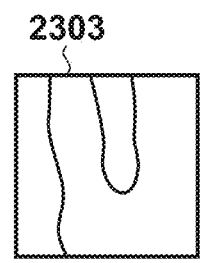
2303
DEFORMATION PROCESSING
2311
2312
2313
ZERO PADDING
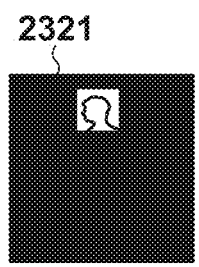
2321
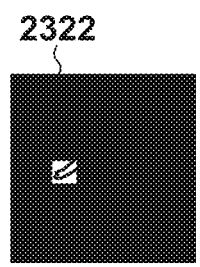
2322
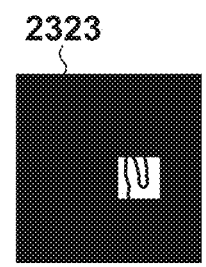
2323

F I G. 23
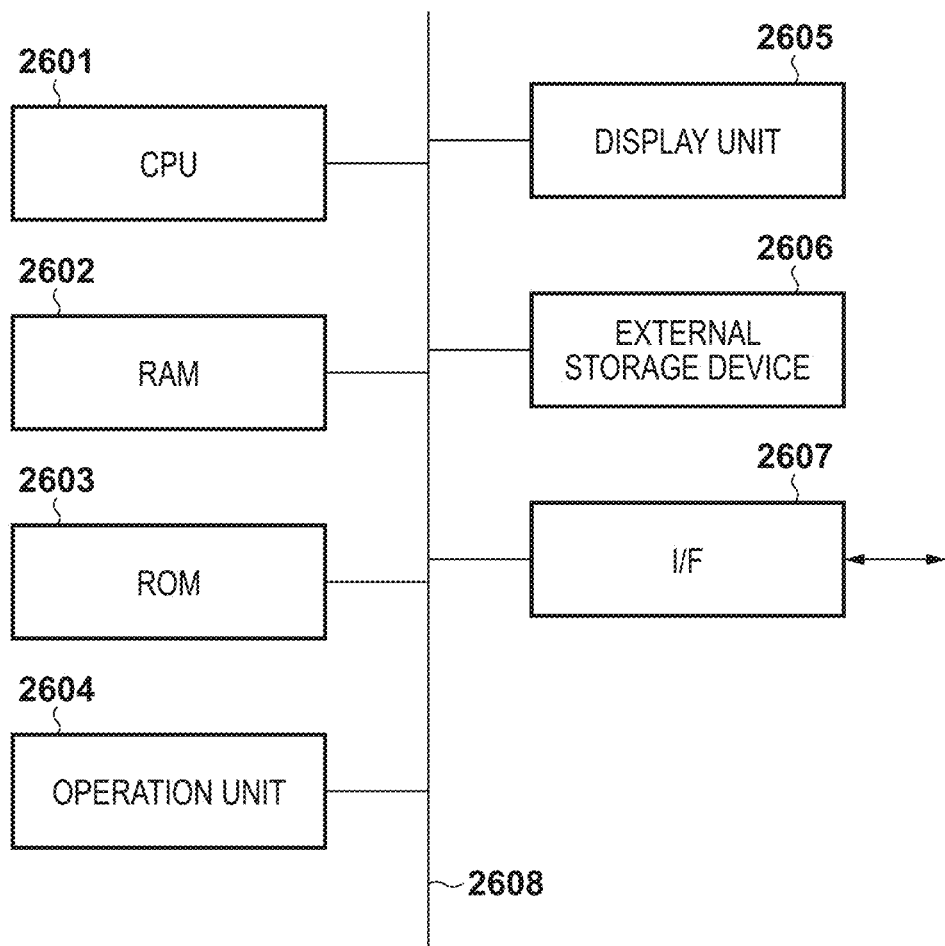

INFORMATION PROCESSING APPARATUS, INFORMATION PROCESSING METHOD, AND NON-TRANSITORY COMPUTER-READABLE STORAGE MEDIUM

BACKGROUND OF THE INVENTION

Field of the Invention

The present invention relates to a technique of recognizing a recognition object.

Description of the Related Art

There is known an apparatus or method for training a recognizer using training data and performing recognition using the recognizer to, for example, recognize an object or a state thereof from the data of a video or the like. As one of such methods, there exists a CNN (Convolutional Neural Network).

The CNN is recently used for the purpose of various applications such as object recognition, action recognition, and scene recognition. As for action recognition, for example, in K. Simonyan and A. Zisserman, "Two-Stream Convolutional Networks for Action Recognition in Videos", NIPS, 2014, an architecture for performing action recognition using a CNN formed from two steams configured to input an RGB image and an optical flow, respectively, is proposed. In addition, to recognize a detailed action, a technology concerning a method of extracting a feature amount using a CNN for each local region of a human body part is proposed in Guilhem Cheron, Ivan Laptev, and Cordelia Schmid, "P-CNN: Pose-based CNN Features for Action Recognition", ICCV, 2015.

There is a demand for a recognition system with an improved recognition capability to more accurately perform detailed recognition of input data.

SUMMARY OF THE INVENTION

The present invention has been made in consideration of the above-described problem, and provide a technique for improving the recognition accuracy of a recognition object.

According to the first aspect of the present invention, there is provided an information processing apparatus comprising: a recognition processing unit configured to acquire a result of recognition processing of a convolutional neural network using recognition object data including information of a recognition object, as an input; a region of interest setting unit configured to set a region of interest for the recognition object data and/or an intermediate layer output of the convolutional neural network; a detail recognition unit configured to perform detail recognition processing more detailed than the recognition processing for the recognition object data and/or the intermediate layer output in the region of interest; an integration processing unit configured to perform integration processing of a result of the detail recognition processing and the intermediate layer output; an intermediate input processing unit configured to input a result of the integration processing as the intermediate layer output to the convolutional neural network; and an output unit configured to output a result of the recognition processing.

According to the second aspect of the present invention, there is provided an information processing apparatus comprising: a recognition processing unit configured to acquire a result of recognition processing of a convolutional neural network using training data including information of a training object, as an input; a region of interest setting unit configured to set a region of interest for the training data and/or an intermediate layer output of the convolutional neural network; a detail recognition unit configured to perform detail recognition processing more detailed than the recognition processing for the training data and/or the intermediate layer output in the region of interest; an integration processing unit configured to perform integration processing of a result of the detail recognition processing and the intermediate layer output; an intermediate input processing unit configured to input a result of the integration processing as the intermediate layer output to the convolutional neural network; and a learning unit configured to perform training processing concerning at least one of the recognition processing unit, the region of interest setting unit, the detail recognition unit, the integration processing unit, and the intermediate input processing unit.

According to the third aspect of the present invention, there is provided an information processing method comprising: acquiring a result of recognition processing of a convolutional neural network using recognition object data including information of a recognition object, as an input; setting a region of interest for the recognition object data and/or an intermediate layer output of the convolutional neural network; performing detail recognition processing more detailed than the recognition processing for the recognition object data and/or the intermediate layer output in the region of interest; performing integration processing of a result of the detail recognition processing and the intermediate layer output; inputting a result of the integration processing as the intermediate layer output to the convolutional neural network; and outputting a result of the recognition processing.

According to the fourth aspect of the present invention, there is provided an information processing method comprising: acquiring a result of recognition processing of a convolutional neural network using training data including information of a training object, as an input; setting a region of interest for the training data and/or an intermediate layer output of the convolutional neural network; performing detail recognition processing more detailed than the recognition processing for the training data and/or the intermediate layer output in the region of interest; performing integration processing of a result of the detail recognition processing and the intermediate layer output; inputting a result of the integration processing as the intermediate layer output to the convolutional neural network; and performing training processing concerning at least one of the recognition processing, the setting of the region of interest, the detail recognition processing, the integration processing, and the input.

According to the fifth aspect of the present invention, there is provided a non-transitory computer-readable storage medium storing a computer program for causing a computer to function as: a recognition processing unit configured to acquire a result of recognition processing of a convolutional neural network using recognition object data including information of a recognition object, as an input; a region of interest setting unit configured to set a region of interest for the recognition object data and/or an intermediate layer output of the convolutional neural network; a detail recognition unit configured to perform detail recognition processing more detailed than the recognition processing for the recognition object data and/or the intermediate layer output in the region of interest; an integration processing unit configured to perform integration processing of a result of the detail recognition processing and the intermediate layer output; an intermediate input processing unit configured to input a result of the integration processing as the intermediate layer output to the convolutional neural network; and an output unit configured to output a result of the recognition processing.

According to the sixth aspect of the present invention, there is provided a non-transitory computer-readable storage medium storing a computer program for causing a computer to function as: a recognition processing unit configured to acquire a result of recognition processing of a convolutional neural network using training data including information of a training object, as an input; a region of interest setting unit configured to set a region of interest for the training data and/or an intermediate layer output of the convolutional neural network; a detail recognition unit configured to perform detail recognition processing more detailed than the recognition processing for the training data and/or the intermediate layer output in the region of interest; an integration processing unit configured to perform integration processing of a result of the detail recognition processing and the intermediate layer output; an intermediate input processing unit configured to input a result of the integration processing as the intermediate layer output to the convolutional neural network; and a learning unit configured to perform training processing concerning at least one of the recognition processing unit, the region of interest setting unit, the detail recognition unit, the integration processing unit, and the intermediate input processing unit.

Further features of the present invention will become apparent from the following description of exemplary embodiments with reference to the attached drawings.

BRIEF DESCRIPTION OF THE DRAWINGS

FIG. 20 is a view showing an example of formation of the data of a part;

FIG. 22 is a block diagram showing an example of the arrangement of a recognition unit 22a;

FIG. 23 is a block diagram showing an example of the hardware arrangement of a computer device;

DESCRIPTION OF THE EMBODIMENTS

Figure 1:
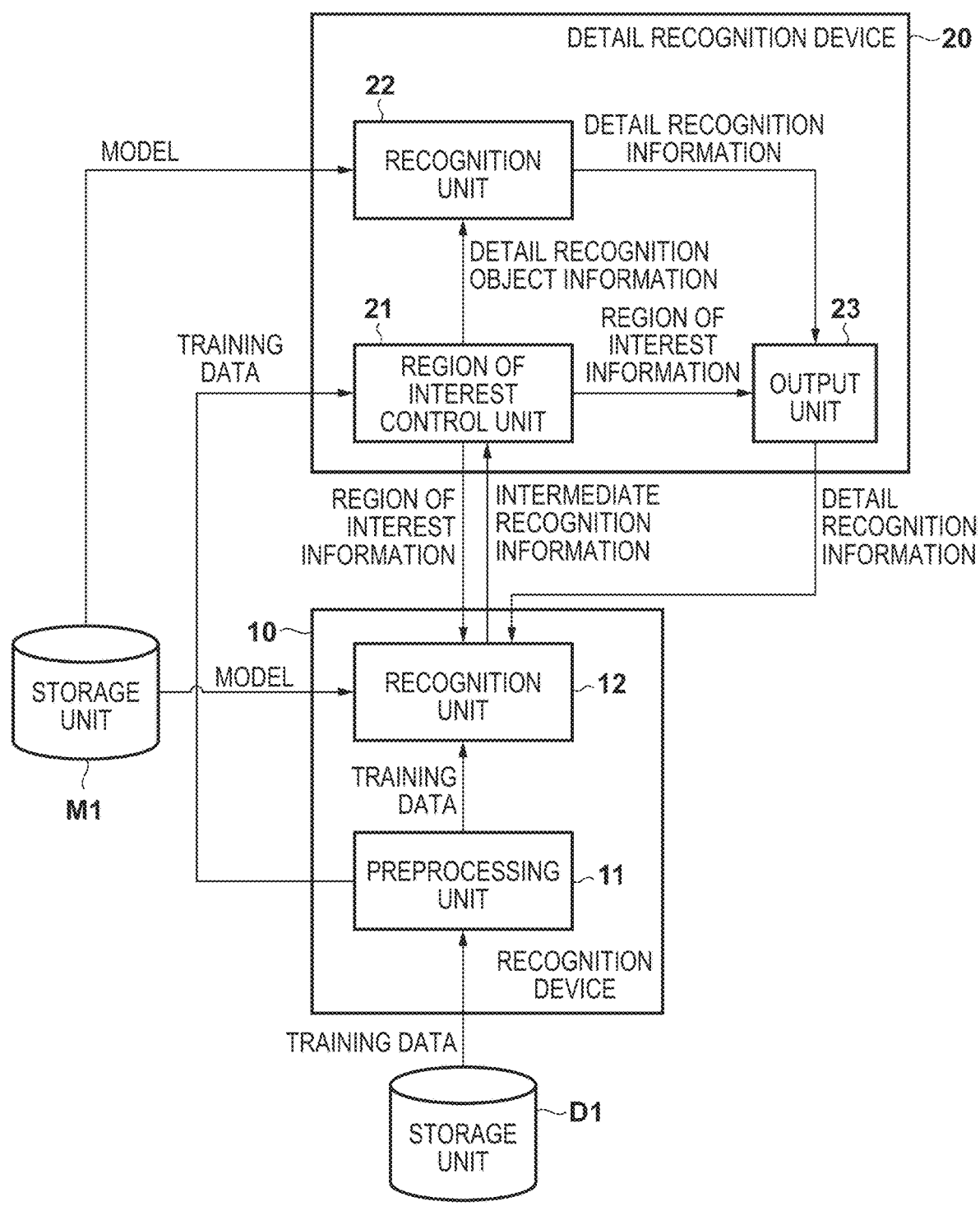
FIG. 1 is a block diagram showing an example of the arrangement of an abnormality detection system.

Embodiments of the present invention will now be described with reference to the accompanying drawings. Note that the embodiments to be described below are examples of detailed implementation of the present invention or detailed examples of the arrangement described in the appended claims.

First Embodiment

In this embodiment, an example in which a CNN (Convolutional Neural Network) serving as a recognizer is trained will be shown. Note that in this embodiment, an example of an arrangement and operation in a case in which a CNN configured to perform recognition concerning the action of an object person in a video and a CNN (detail CNN) configured to perform more detailed recognition are used is shown, and a detailed example thereof will be described later.

In this embodiment, when performing recognition processing, not only a normal feature amount but also a detailed feature amount (detailed feature amount) of a region of interest that can contribute to recognition is extracted, and recognition processing is performed while sequentially integrating the extracted detailed feature amount with the normal feature amount. More specifically, the feature amount (detailed feature amount) of a second CNN configured to recognize a detailed feature is integrated with the intermediate layer feature map of a first CNN configured to recognize a normal feature. At this time, the detailed feature amount is integrated with a region corresponding to the region of interest on the intermediate layer feature map of the first CNN, thereby implementing integration of the detailed feature amount (ROI embedding). Here, "integration" means integrating one or more detailed feature amounts with the intermediate layer feature map of the first CNN, and means reflecting the detailed feature amount on the intermediate layer feature map via, for example, addition, substitution, non-linear transformation, or the like. As a characteristic of "ROI embedding", a data flow for integration processing of the feature amount of the first CNN and the detailed feature amount is changed in correspondence with the position, size, shape, and the like of the region of interest, which change moment by moment, thereby changing the structure of an overall neural network (NN). Especially, in this embodiment, an example in which a part of a human body is set to a region of interest and the detailed feature amount of each part is extracted and sequentially integrated on the intermediate layer feature map of the first CNN configured to recognize the feature of the whole body will be described.

In this embodiment, an abnormality detection system that is a system configured to detect an abnormality concerning an object or a phenomenon in a video captured by an image capturing device such as a monitoring camera will be described as an example. The abnormality detection system according to this embodiment captures a monitoring object by an image capturing device and checks, based on a video obtained by the image capturing, whether the monitoring object has an abnormality. Upon checking that the monitoring object has an abnormality, the abnormality detection system performs processing for warning a watchman who resides in a monitoring center such as a security office. The monitoring objects include, for example, indoor and outdoor in general households, or public facilities such as hospitals and stations.

The operation of the abnormality detection system according to this embodiment includes four stages: "training: Forward Stage", "training: Backward Stage", "training: Final Stage", and "detection". Of the four stages, the first three stages represent operations in "training", and the fourth stage represents an operation when performing the above-described abnormality detection processing based on a training result ("detection").

FIG. 1 is a block diagram showing an example of an arrangement concerning "training: Forward Stage" that is an operation stage for training the CNN in arrangements provided in the abnormality detection system according to this embodiment. A recognition device 10 and a detail recognition device 20 may be connected via an electronic circuit, may be connected via a device such as a storage device, or may be connected via a network (formed by at least one of a wireless network and a wired network). As the network, for example, a portable telephone network or the Internet can be applied. Note that as for devices and functional units to be described below as well, the devices or functional units may be connected in any connection form.

Figure 2:
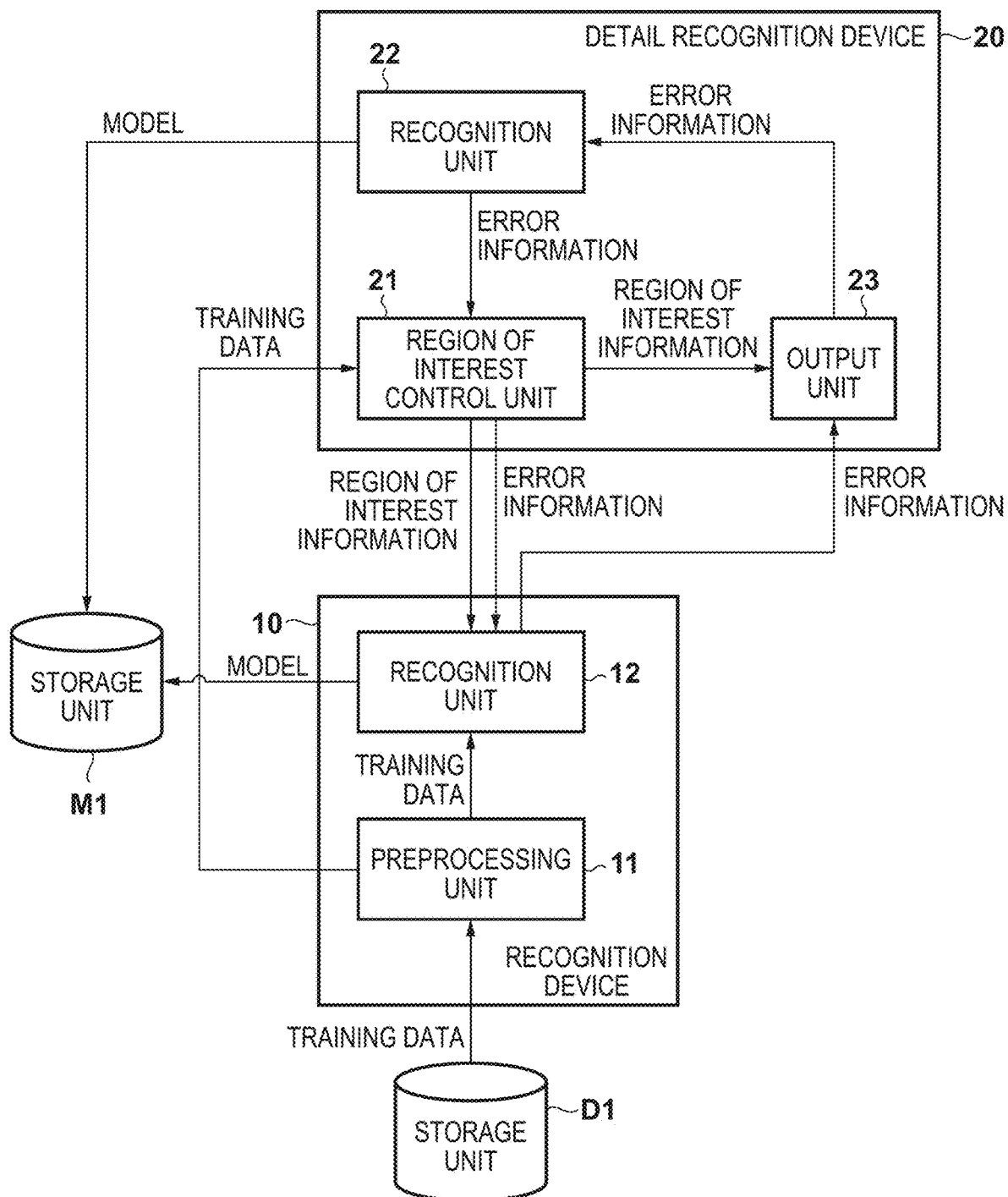
FIG. 2 is a block diagram showing an example of the arrangement of the abnormality detection system.
Figure 3:
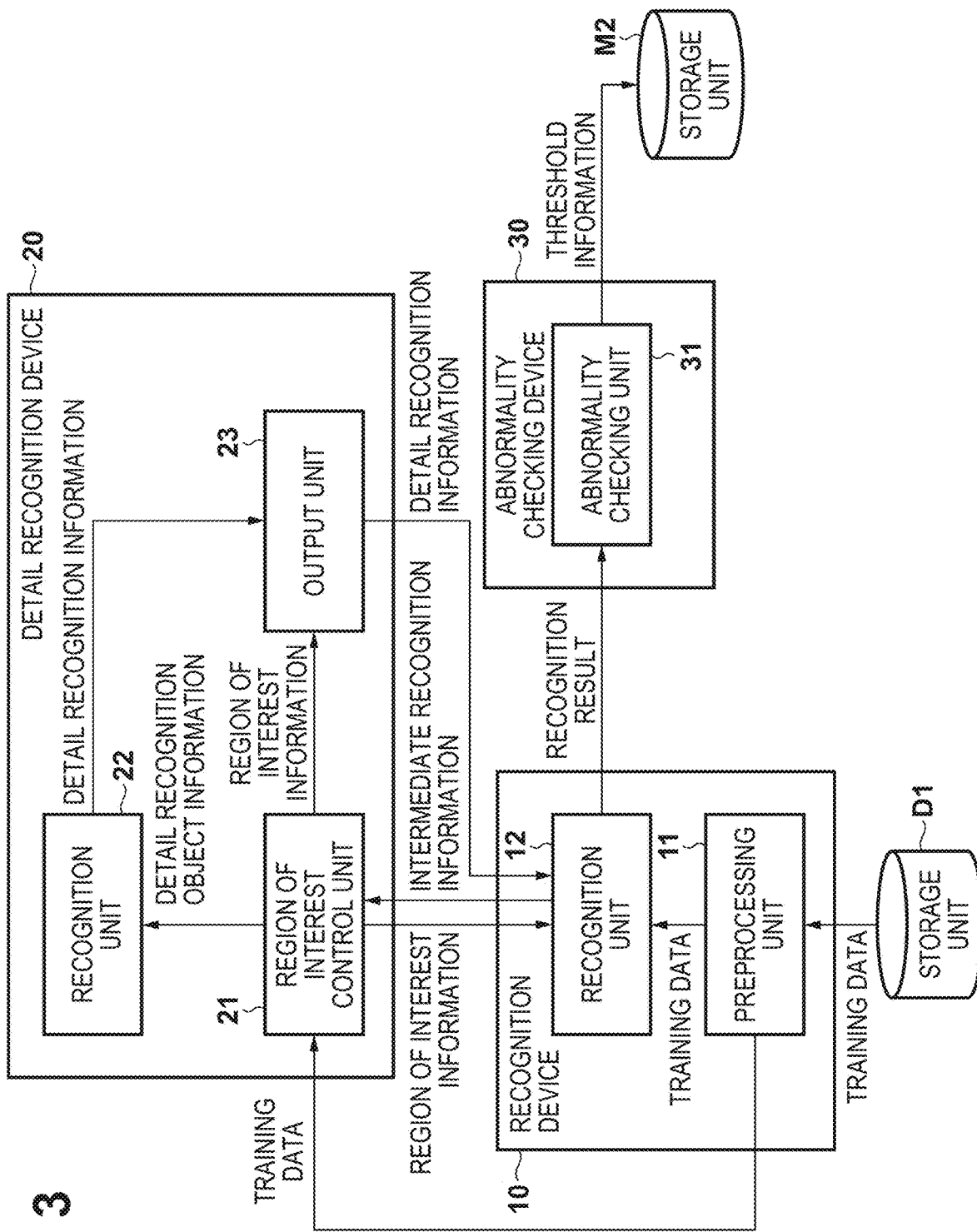
FIG. 3 is a block diagram showing an example of the arrangement of the abnormality detection system.

FIG. 2 is a block diagram showing an example of an arrangement concerning "training: Backward Stage" that is an operation stage for training the CNN in arrangements provided in the abnormality detection system according to this embodiment. FIG. 3 is a block diagram showing an example of an arrangement concerning "training: Final Stage" that is an operation stage for training the CNN in arrangements provided in the abnormality detection system according to this embodiment. In the arrangement shown in FIG. 3, an abnormality checking device 30 is added to the arrangement shown in FIGS. 1 and 2.

Figure 5:
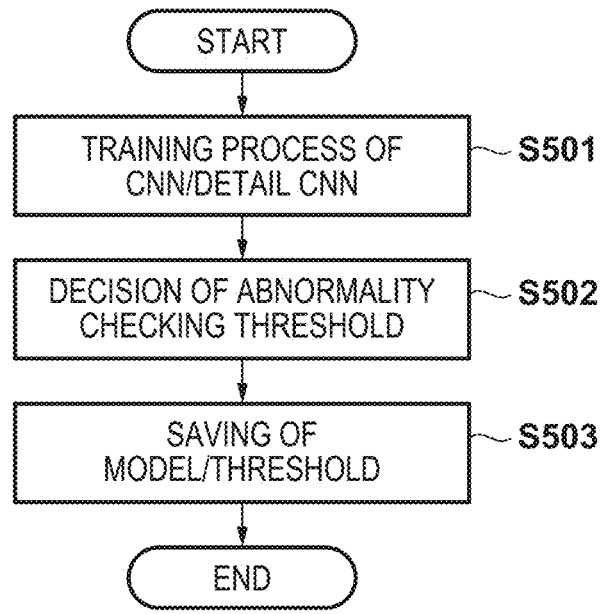
FIG. 5 is a flowchart of processing performed by the abnormality detection system.

The operation of the abnormality detection system at the time of training of the CNN will be described with reference to the flowchart of FIG. 5. In step S501, the recognition device 10 performs training of the first CNN using training data as input data, and the detail recognition device 20 performs training of the second CNN using, as input data, the training data and "the output of the first CNN" that is the output from the recognition device 10. Here, the first CNN is a CNN used by the recognition device 10. In addition, the second CNN is a CNN used by the detail recognition device 20, which is a CNN configured to receive the output of the first CNN and the like and perform detailed recognition processing, as will be described later in detail. The first CNN operates to further receive the (intermediate) detail recognition processing result of the second CNN and perform recognition processing, as will be described later in detail. Note that the operation of step S501 includes the operation in the stage "training: Forward Stage" and the operation in the stage "training: Backward Stage". A detailed operation in each stage will be described later.

In step S502, the abnormality checking device 30 receives the recognition result from the recognition device 10 and obtains a threshold (to be referred to as an abnormality threshold hereinafter) concerning abnormality detection. The operation of step S502 corresponds to the operation in the stage "training: Final Stage", and detailed contents will be described later.

In step S503, saving processing of each of the model of the first CNN obtained by the training processing of the recognition device 10, the model of the second CNN obtained by the training processing of the detail recognition device 20, and the abnormality threshold obtained by the abnormality checking device 30 is performed. The model of the first CNN and the model of the second CNN are saved in a storage unit M1 by the recognition device 10 and the detail recognition device 20, respectively, and the abnormality threshold is saved in a storage unit M2 by the abnormality checking device 30. Here, the model of the CNN (each of the first CNN and the second CNN) is a data set holding parameters that define the CNN. The model of the CNN includes data that defines the connection load between neurons in the CNN, data that defines the network structure of the CNN, data that defines a neuron response function, and the like.

Figure 4:
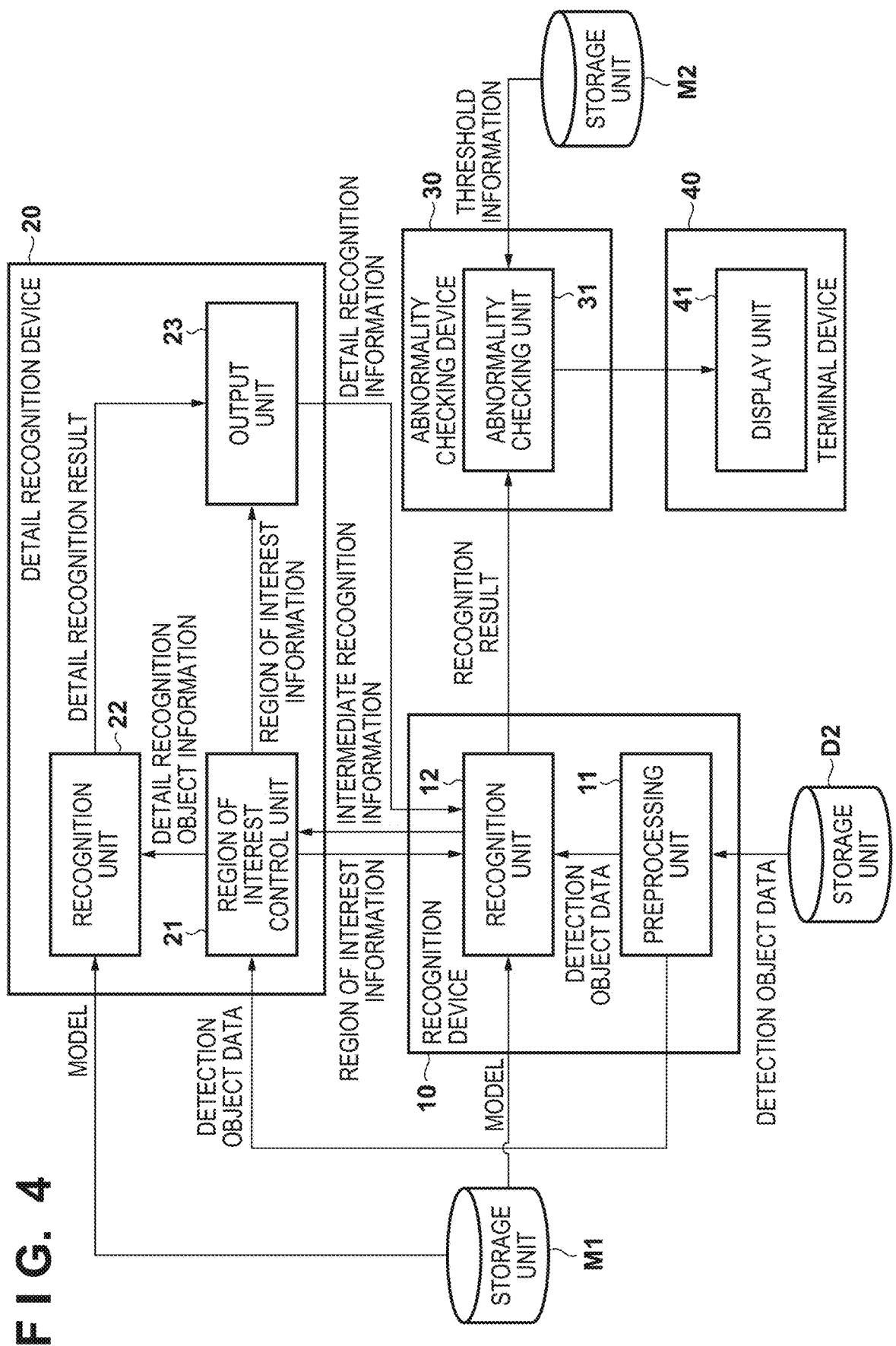
FIG. 4 is a block diagram showing an example of the arrangement of the abnormality detection system.

FIG. 4 is a block diagram showing an example of an arrangement concerning "detection" that is an operation stage concerning an operation at the time of abnormality detection in arrangements provided in the abnormality detection system according to this embodiment. In the arrangement shown in FIG. 4, a terminal device 40 to which the display of a PC (Personal Computer), a tablet PC, a smartphone, a feature phone, and the like can be applied is added to the arrangement shown in FIG. 3.

Figure 7:
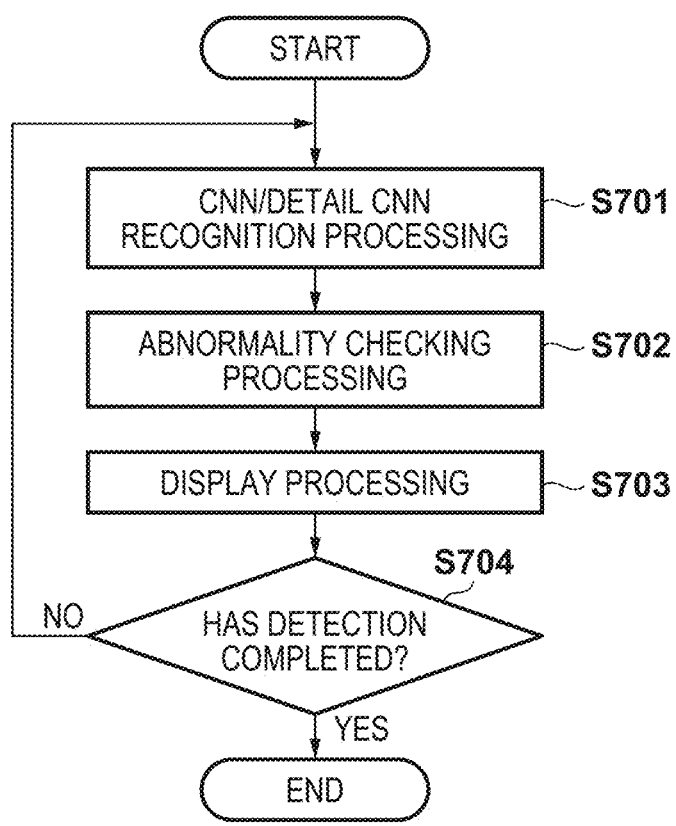
FIG. 7 is a flowchart of processing performed by the abnormality detection system.

An operation in the stage "detection" of the abnormality detection system will be described with reference to the flowchart of FIG. 7. In step S701, the recognition device 10 and the detail recognition device 20 perform recognition processing of detection object data using the first CNN (recognition processing of the first CNN) and recognition processing of detection object data using the second CNN (recognition processing of the second CNN), respectively. At this time, the models obtained at the time of above-described training may be used as the first CNN and the second CNN. However, other models may be used, instead of using the models obtained at the time of training of the abnormality detection system.

In step S702, the abnormality checking device 30 performs abnormality check for the result of recognition processing of the first CNN for the detection object data. At this time, the abnormality threshold obtained at the time of training is used as a threshold when performing the abnormality check. However, another threshold (for example, a threshold designated by the user) may be used, instead of using the threshold obtained at the time of training of the abnormality detection system. At this time, how to perform threshold check will be described later.

In step S703, the terminal device 40 receives the result of abnormality check by the abnormality checking device 30 and performs display processing based on the received check result. Details of the display processing will be described later.

The operation of each device will be described next. Schematic contents of the operation of each device and the order of processing procedure will be described here. A detailed arrangement and operation of each functional unit of each device will be described anew in an explanation of the functional unit.

Figure 6:
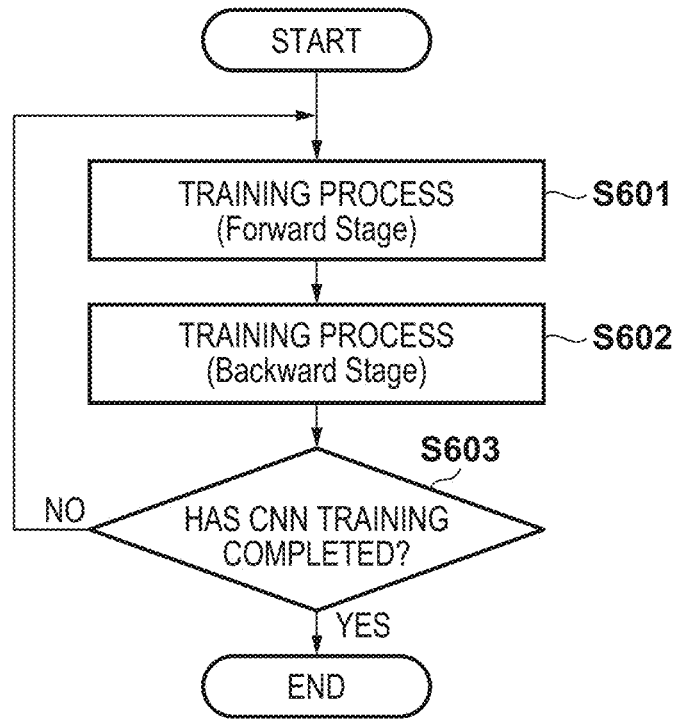
FIG. 6 is a flowchart showing details of the process of step S501.

A description of the operation in training will be made first. The procedure of the operation in training has already been described with reference to FIG. 5. Hence, a description will be made here based on FIG. 6 as a supplement to the explanation of FIG. 5.

In step S501, training processing in each of the stage "training: Forward Stage" and the stage "training: Backward Stage" is executed, as described above. Details of the process of step S501 will be described with reference to the flowchart of FIG. 6.

In step S601, training processing in the stage "training: Forward Stage" is executed by the arrangement shown in FIG. 1. First, a preprocessing unit 11 receives training data from a storage unit D1. In this embodiment, since a video including a human body captured by an image capturing device such as a monitoring camera is assumed to be saved as training data in the storage unit D1, the preprocessing unit 11 acquires the video from the storage unit D1 as training data. The preprocessing unit 11 performs preprocessing of, for example, extracting the region of the human body (human body region) in the video, and then shapes the training data as training data for the first CNN and sends it to a recognition unit 12 (details will be described later). The recognition unit 12 performs recognition processing of the first CNN based on the training data received from the preprocessing unit 11. The recognition processing of the first CNN means a series of processes to recognize data by the first CNN. Note that in the recognition processing according to this embodiment, recognition processing of the first CNN and recognition processing of the second CNN depend on each other. A detailed example will be described below. The recognition unit 12 sends the output (intermediate recognition information) of a predetermined intermediate layer in the first CNN, which is obtained by the recognition processing of the first CNN, to a region of interest control unit 21. In addition, the preprocessing unit 11 sends the training data (including supervisory data to be described later) received by the recognition unit 12 to the region of interest control unit 21. The region of interest control unit 21 sets an object to be recognized by the second CNN from the received training data and the output of the predetermined intermediate layer in the first CNN, and sends detail recognition object data (detail recognition object information) that defines the set object to a recognition unit 22. A detailed method of creating the detail recognition object data will be described later. In this embodiment, the detail recognition object data holds data concerning a human body part to focus to do action recognition of a person as a recognition object. The region of interest control unit 21 sends region data (region of interest information) that defines the region (region of interest) of a part of the person as the recognition object to an output unit 23 and the recognition unit 12. The recognition unit 22 performs recognition processing for the received detail recognition object data and sends the result of the recognition processing (detail recognition information) as a detail recognition processing result to the output unit 23. To output the result of recognition by the recognition unit 22, the output unit 23 sends the result of detail recognition to the recognition unit 12 based on the received region data described above. That is, detail recognition information is transmitted by returning the information for the region of the output of the predetermined intermediate layer of the first CNN (there are variations regarding this point, and details will be described later). The recognition unit 12 continues the recognition processing of the first CNN based on the intermediate layer output of the first CNN and the detail recognition information received from the output unit 23.

At this time, detailed recognition processing may further be performed using the second CNN. Note that the recognition unit 12 uses the received region data in the next stage "training: Backward Stage". Finally, the recognition unit 12 performs processing based on a predetermined loss function. For example, a method of calculating an error by a squared error based on the supervisory data included in the training data, or the like is possible. Note that not the squared error but another known loss function may be used.

Next, in step S602, training processing in the stage "training: Backward Stage" is executed by the arrangement shown in FIG. 2. Here, the models are updated based on an evaluation result for the result of recognition processing by the recognition unit 12. As the training algorithm, for example, back propagation can be used. Back propagation is a method of performing training by propagating an error of an evaluation result from the upper layer to the lower layer of a neural network, and details will be described later. First, the recognition unit 12 performs model updating based on error information. In addition, the recognition unit 12 propagates, to the second CNN, error information concerning the region of the first CNN to which the output of the second CNN is input. At this time, the recognition unit 12 specifies the region of interest of the first CNN based on region data, and sends the error information of the region of interest to the output unit 23. Note that the error here indicates an error back-propagated from the upper network of the first CNN to the region of interest in the process of training by the back propagation. In addition, the output unit 23 sends the error information to the recognition unit 22. At this time, it is necessary to decide to which part of the second CNN the error information should be sent. Here, the error information is sent to the output neuron of the second CNN, which has output detailed information to the region of interest. That is, the error information propagates through a path reverse to the path of recognition processing of input data in the stage "training: Forward Stage". The recognition unit 22 updates the model of the second CNN based on the received error information (details will be described later). In addition, the received error information is further back-propagated to the recognition unit 12, and the recognition unit 12 updates the model of the first CNN based on the received error information. As described above, the first CNN and the second CNN can be updated based on the back propagation.

Next, in step S603, it is checked whether training is completed. The criterion of this check will be described later. Upon checking that training is not completed, the process advances to step S601. Upon checking that training is completed, the operation shown in FIG. 6 ends, and the process advances to step S502.

Referring back to FIG. 5, next, in step S502, a threshold used for abnormality detection is decided based on the recognition results of the first CNN and the second CNN trained in steps S601 and S602 as the stage "training: Final Stage". The recognition unit 12 sends a recognition result for the training data to an abnormality checking unit 31. Based on the recognition result of the recognition unit 12, the abnormality checking unit 31 decides a threshold that is a reference used to check whether the recognition object is abnormal. As the threshold deciding method at this time, a known existing method is used. For example, assume that training is performed such that the first CNN can recognize the action of the recognition object, and it is possible to recognize whether the recognition object has "fallen". At this time, assuming that a "fall" class is a class to be checked as abnormal, if the probability representing that the action of the recognition object is the "fall" class is 50% or more, it may be checked that the recognition object is abnormal. At this time, "50%" is the abnormality threshold. As an approach other than the method of giving a fixed threshold in advance in this way, the threshold may be decided by evaluation data. More specifically, an evaluation data set (for example, a video) different from the training data set is prepared. At this time, when the probability of "fall" for each evaluation data is obtained using the trained first CNN, a threshold capable of checking that all evaluation data that are "fall" truly as "fall" can be decided, and such a threshold may be set as the abnormality threshold. As still another method, a model (normal model) within a normal range may further be trained based on the feature amount of the first CNN, and it may be checked based on the trained model (normal model) whether the recognition object is normal. As the feature amount of the first CNN used at this time, for example, the output (intermediate layer output) of the immediately preceding layer of the final layer may be used as the feature amount. In addition, any method can be employed as the method of training the normal model used at the time. For example, a method described in Japanese Patent Laid-Open No. 2014-203289 can be used. The feature amount used for abnormality check, such as the threshold or normal model decided here, is stored in the storage unit M2.

Next, the operation of the abnormality detection system in the stage "detection" will be described next with reference to the flowchart of FIG. 7. In step S701, recognition processing of the first CNN and recognition processing of the second CNN are performed. First, the preprocessing unit 11 acquires a video including a human body captured by an image capturing device such as a monitoring camera from a storage unit D2 as detection object data. The preprocessing unit 11 performs preprocessing of, for example, extracting the human body region from the video, as in the training, and then shapes (details will be described later) the detection object data as detection object data for the first CNN and sends it to the recognition unit 12. The recognition unit 12 and the recognition unit 22 perform recognition processing of the first CNN and recognition processing of the second CNN, respectively, based on the detection object data. Details of the processing are the same as in the above-described stage "training: Forward Stage", and a description thereof will be omitted.

In step S702, the abnormality checking unit 31 checks, based on the recognition result of the recognition unit 12 for the detection object data, whether an abnormality exists. At this time, the abnormality checking unit 31 receives the abnormality threshold (or the normal model) stored in the storage unit M2 in the above-described stage "training: Final Stage", and uses it for abnormality check.

Next, in step S703, the terminal device 40 receives the abnormality checking result by the abnormality checking unit 31 and performs display processing for causing a display unit 41 to do display based on the received result. If an abnormality checking result representing that the detection object is abnormal is sent, the display unit 41 may perform display representing a warning. For example, a portion of the detection object checked as abnormal on the video captured by the image capturing device such as a monitoring camera may be highlighted. At this time, to highlight the abnormal portion, the abnormal portion on the video needs to be specified. For this purpose, for example, screen coordinate data may be added to the input detection object data, and the coordinate data may be used in accordance with the abnormality checking result.

Note that as the warning operation in a case in which the detection object is abnormal, the abnormality detection system may perform another processing in addition to or in place of performing display representing a warning. For example, if the abnormality detection system includes a lamp and a siren, a warning sound may be generated by the siren, and the lamp may be blinked simultaneously.

Next, if the next video remains, the process returns to step S701 via step S704. On the other hand, if the next video does not remain, the processing according to the flowchart of FIG. 7 ends.

Figure 8:
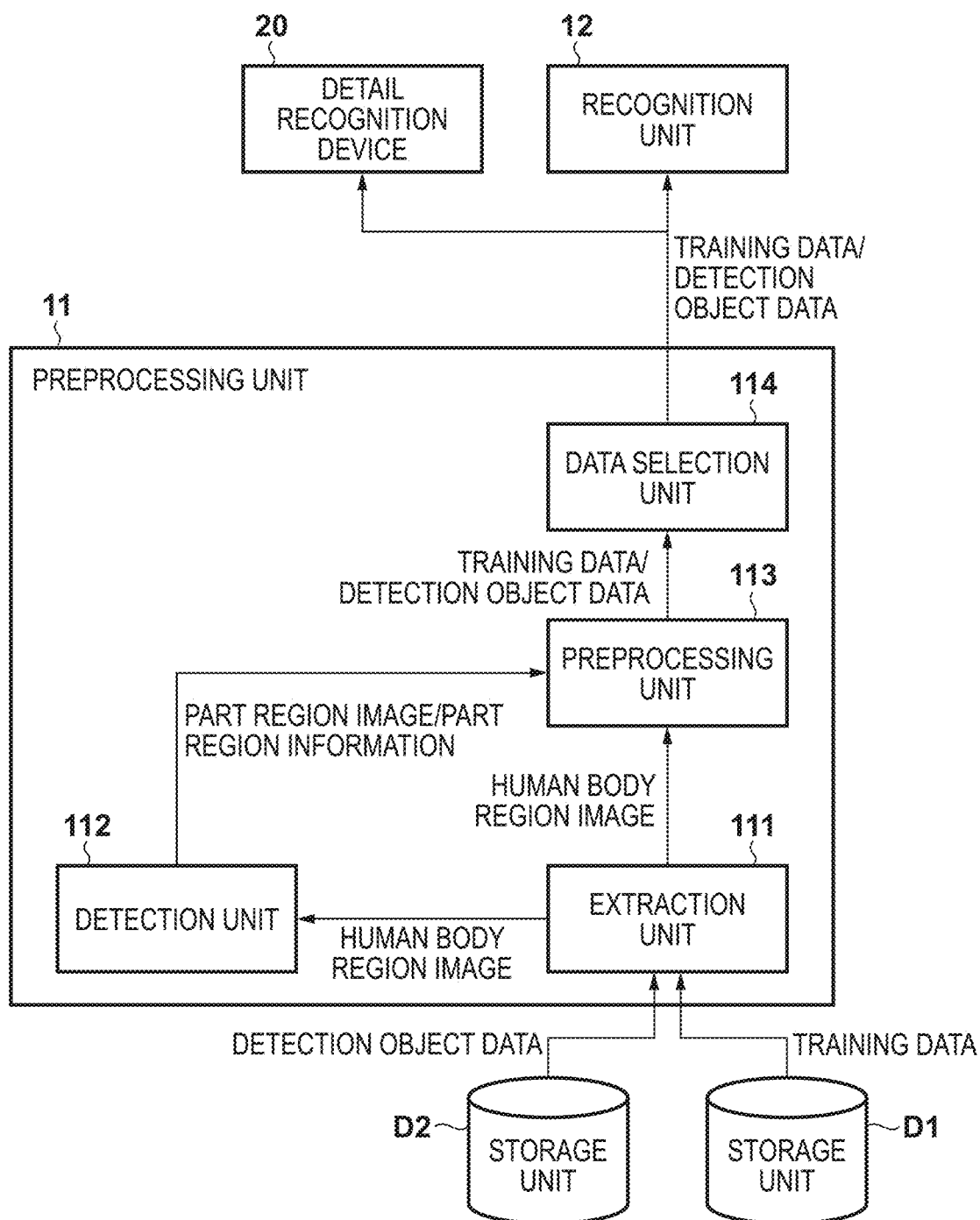
FIG. 8 is a block diagram showing an example of the arrangement of a preprocessing unit 11.
Figure 11:
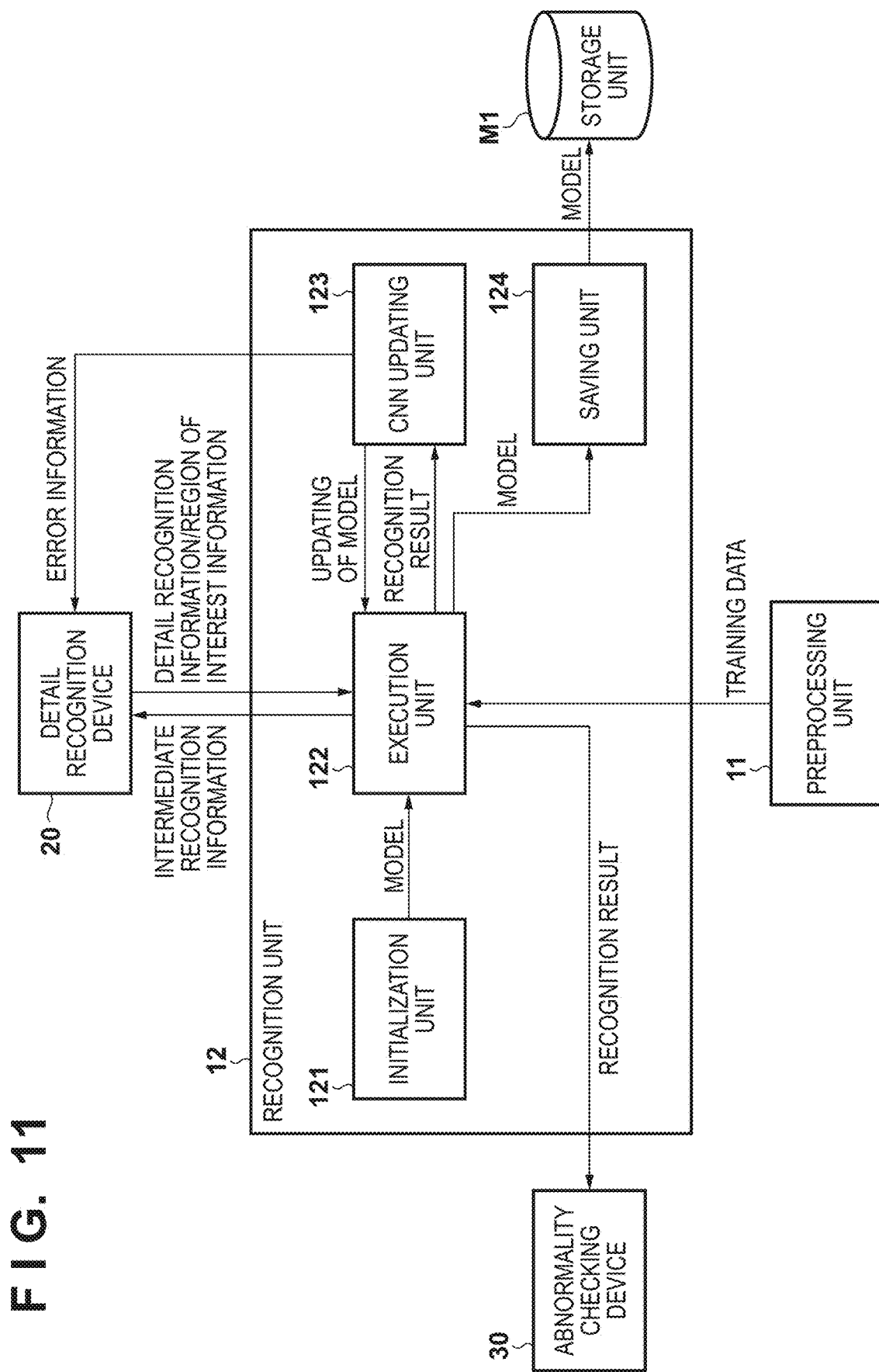
FIG. 11 is a block diagram showing an example of the arrangement of a recognition unit 12.
Figure 14:
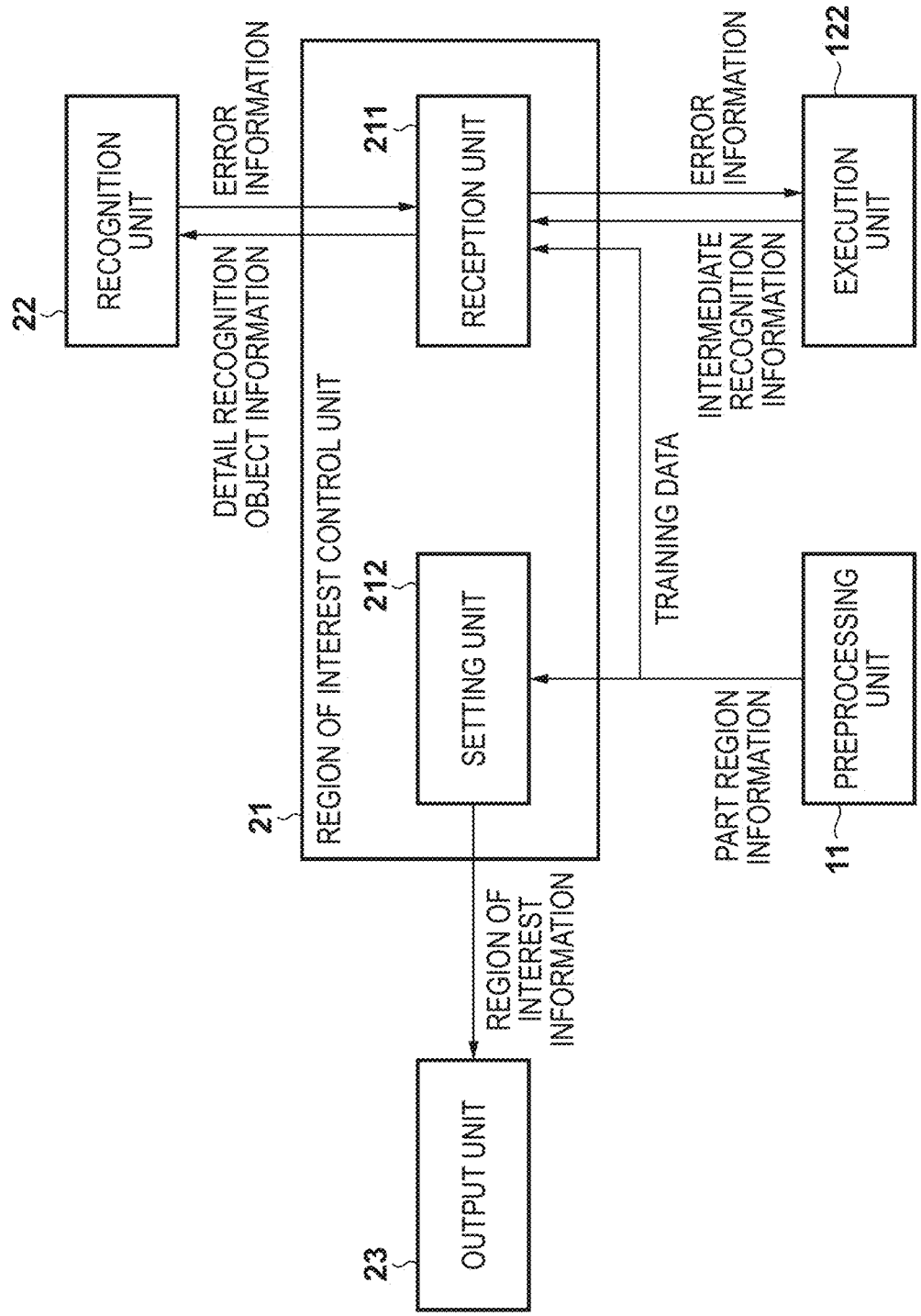
FIG. 14 is a block diagram showing an example of the arrangement of a region of interest control unit 21.
Figure 15:
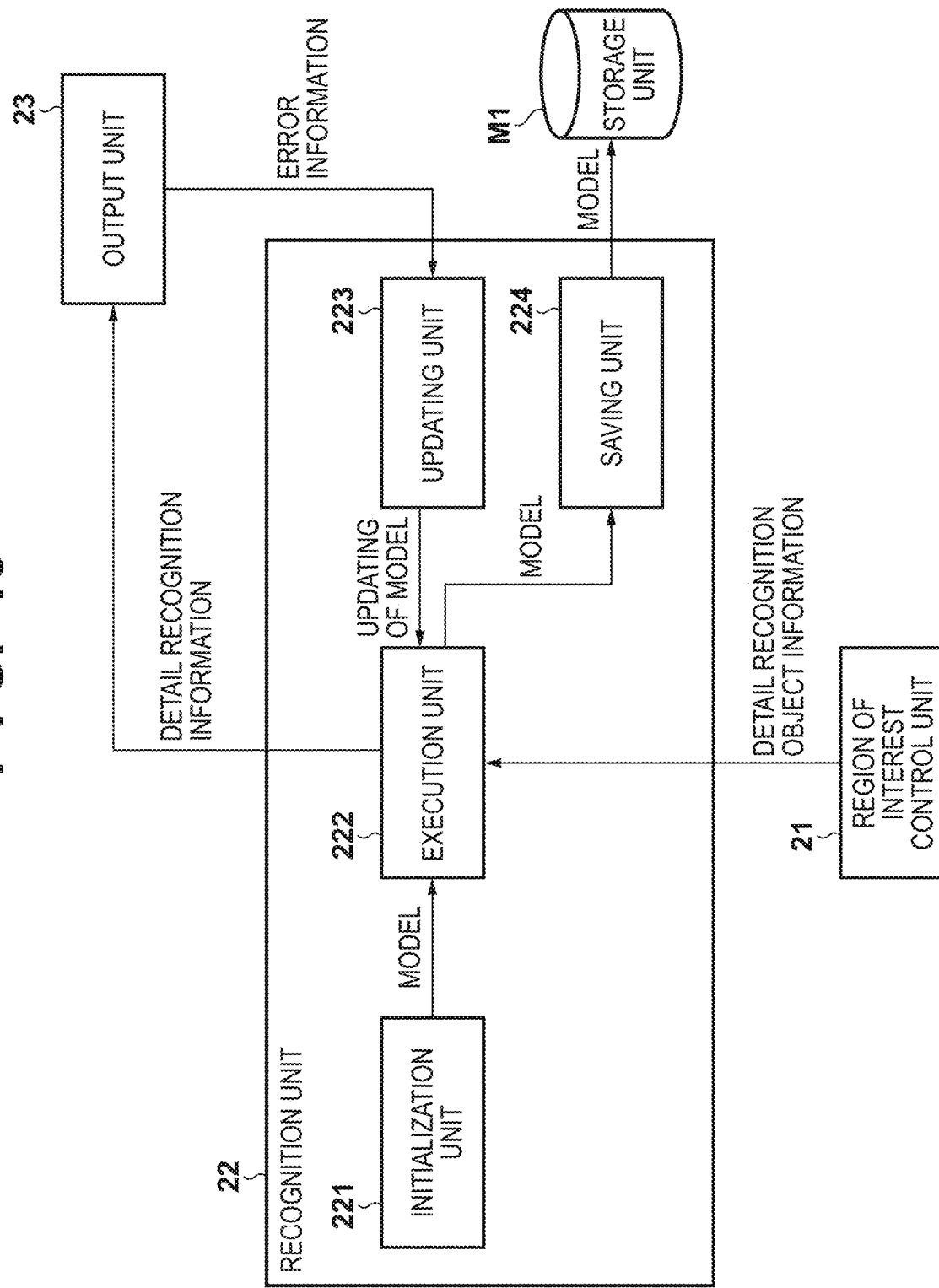
FIG. 15 is a block diagram showing an example of the arrangement of a recognition unit 22.
Figure 16:
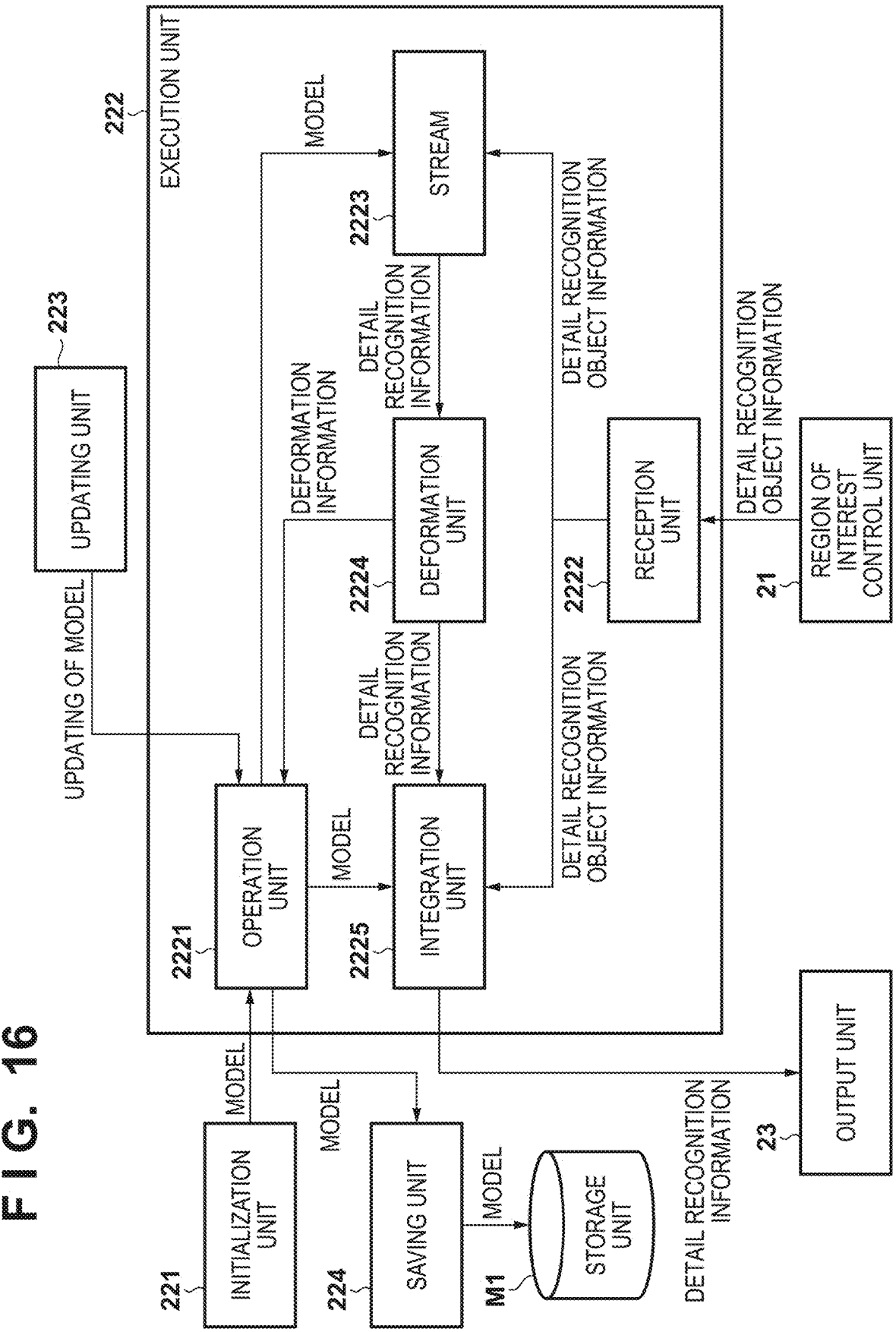
FIG. 16 is a block diagram showing an example of the arrangement of an execution unit 222.
Figure 17:
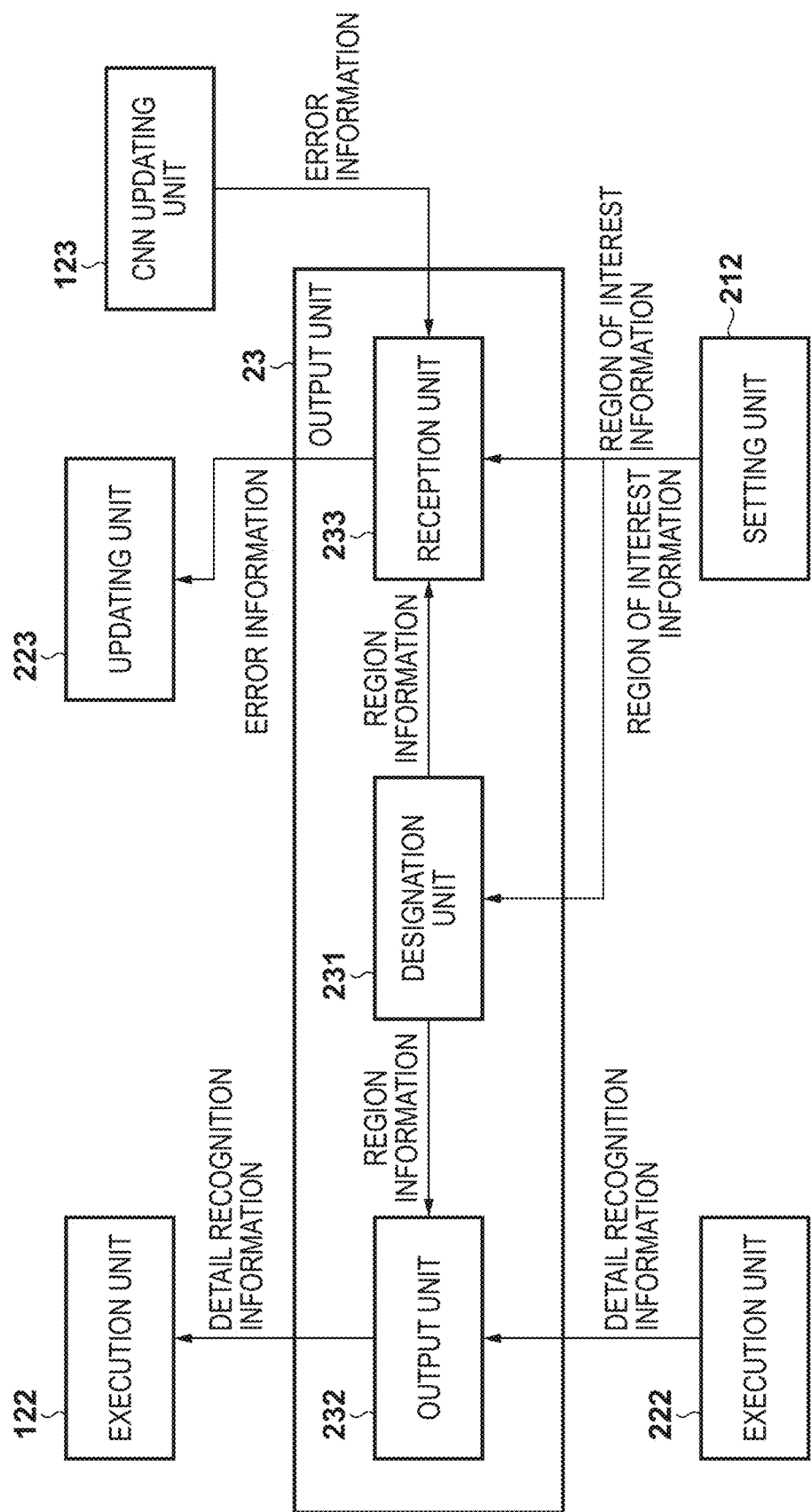
FIG. 17 is a block diagram showing an example of the arrangement of an output unit 23.

The arrangement and operation of each functional unit provided in each of the above-described devices will be described next. FIG. 8 is a block diagram showing an example of an arrangement associated with training and detection in the functional units provided in the above-described preprocessing unit 11. FIG. 11 is a block diagram showing an example of an arrangement associated with training in the arrangement of the above-described recognition unit 12. FIG. 14 is a block diagram showing an example of an arrangement associated with training in the arrangement of the above-described region of interest control unit 21. FIG. 15 is a block diagram showing an example of an arrangement associated with training in the arrangement of the above-described recognition unit 22. FIG. 16 is a block diagram showing an example of an arrangement associated with training in the arrangement of an execution unit 222 of the recognition unit 12 shown in FIG. 15. FIG. 17 is a block diagram showing an example of an arrangement associated with training in the arrangement of the above-described output unit 23.

Figure 9:
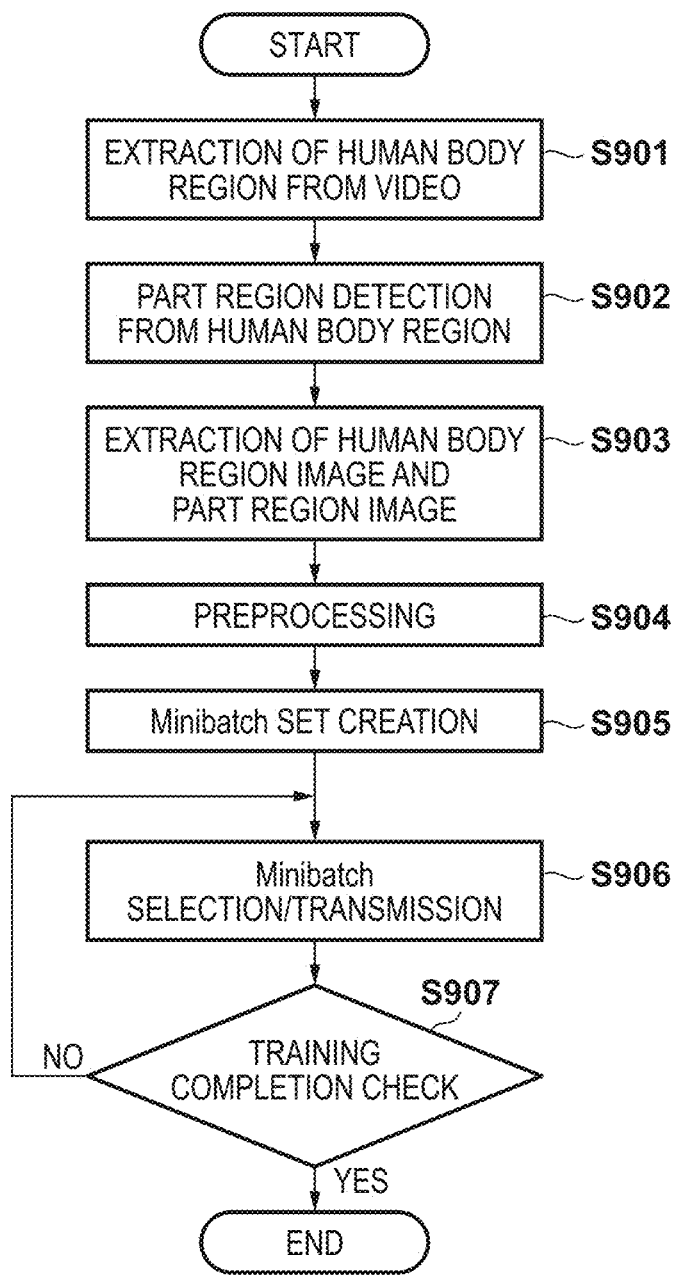
FIG. 9 is a flowchart of processing performed by the preprocessing unit 11.
Figure 10:
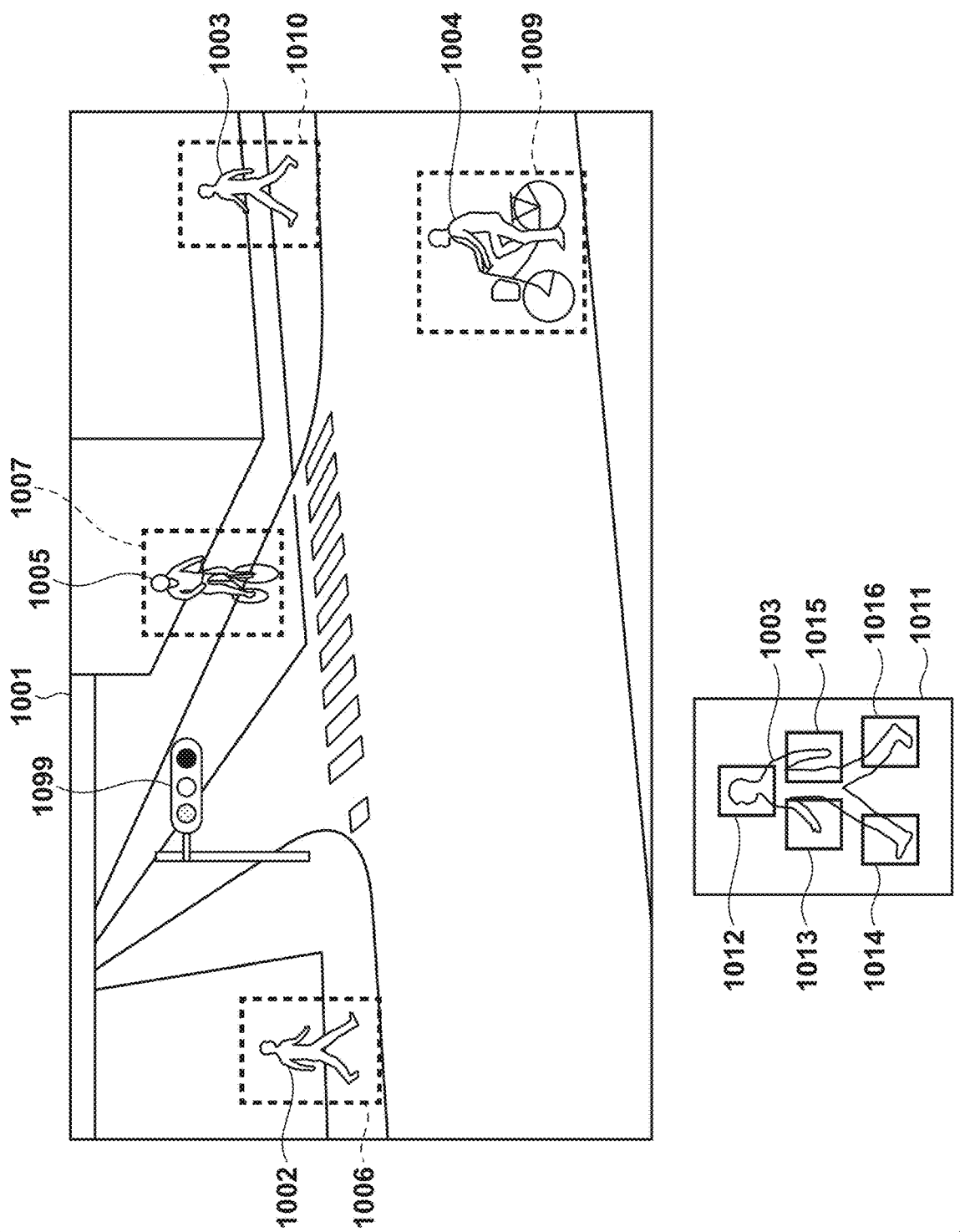
FIG. 10 is a view showing an example of the image of one frame.

The operation of the preprocessing unit 11 (FIG. 8) at the time of training will be described next with reference to the flowchart of FIG. 9. In step S901, an extraction unit 111 loads training data from the storage unit D1. In this embodiment, this training data is assumed to include a video including a human body captured by an image capturing device such as a monitoring camera. The extraction unit 111 extracts a human body region from the video. If the video is a moving image, a human body region is extracted from the image of each frame. FIG. 10 shows an example of the image of one frame in a video (monitoring video) as a moving image. An image 1001 shown in FIG. 10 is an example of the image of one frame in a monitoring video at an intersection. Reference numerals 1002 to 1005 denote objects included in the image 1001. Reference numerals 1006, 1010, 1009, and 1007 denote Bounding Boxes extracted by the extraction unit 111 for the objects 1002 to 1005, respectively. Each of partial images surrounded by the Bounding Boxes corresponds to a human body region. Note that each Bounding Box shown here is merely a detailed example in a case in which a human body region is extracted, and a small region along the outline of a captured object may be extracted by, for example, a background difference method to be described later. Reference numeral 1099 denotes a traffic signal.

There exist a plurality of methods for extracting such human body regions from a video, and any method can be employed. The methods include three methods, for example, a background difference method, an object detection/tracking method, and a region division method.

If the object as the monitoring object is known in advance, like a human body, the object detection/tracking method exclusively used for the purpose of detecting and tracking only a target object is relatively suitable for the extraction unit 111. As the object detection/tracking method, for example, a method described in literature 1 below can be used.

Literature 1 . . . H. Grabner, M. Grabner and H. Bischof, "Real-Time Tracking via On-line Boosting", Proceedings of the British Machine Conference, pages 6.1-6.10. BMVA Press, September 2006

In addition, the extraction unit 111 adds supervisory data to the human body region using supervisory data added to the training data (monitoring video) in advance. For example, when extracting a rectangular human body region, it is possible to define the Bounding Box of the human body region and add supervisory data to the Bounding Box. Additionally, for example, when extracting a human body region along the outline of a human body, it is possible to define the mask of the human body region for the image and add supervisory data to the mask. Supervisory data is a label representing how an object should be classified. The type of a label or which label should be added to which object depends on the problem and is therefore decided in advance by the user who uses or introduces the abnormality detection system, and supervisory data is added to the training data. Here, the supervisory data added to the training data in advance can be added by the user to, for example, a region of the captured image of an object. More specifically, the user can manually designate, for example, the region of the object 1003 that is a walker and add a label representing, for example, a walker to the region. At this time, in a case in which the region of the added supervisory data is superimposed on the extracted human body region, the extraction unit 111 can add supervisory data superimposed at the largest area ratio on the human body region. Note that the supervisory data need not always be added in the above-described way. For example, human body regions are extracted in advance, and the user may add supervisory data to each human body region. Note that in this embodiment, an example in which a human body region is extracted has been described. However, the extracted region is not limited to the human body region, and the region of another object may be extracted. In addition, the entire image may be set to the object of recognition processing, instead of extracting a region. Which region should be extracted and set to the object of recognition processing depends on the problem and needs to be set in accordance with the problem. Finally, the extraction unit 111 sends the extracted human body region (image) to a preprocessing unit 113 and a detection unit 112. Note that for the sake of simplicity of the description, in step S901, all training data used in the abnormality detection system are received at once, human body regions are extracted from the received training data, and all the extracted human body regions are set to the objects of subsequent processing. Note that if the data size of the training data is very large, it is difficult to acquire all data at once by communication. Hence, in this case, training data may be acquired one by one. In the following explanation, processing/communication is assumed to be performed at once for all training data unless it is specifically stated otherwise (for example, in a case in which a Minibatch or the like is described).

In step S902, the detection unit 112 receives a human body region from the extraction unit 111. An example of the human body region received here is denoted by reference numeral 1011 in the lower part of FIG. 10. Reference numeral 1003 in the human body region 1011 indicates that the person is the same as the object (person) 1003 in the image 1001 in the upper part of FIG. 10. Reference numeral 1012 denotes a head region; 1013, a right hand region; 1014, a right foot region; 1015, a left hand region; and 1016, a left foot region. Each part region is an example of a part region detected by the detection unit 112. The part region of the object detected here may be decided in advance in accordance with, for example, the problem to be recognized. For example, to detect a shoplifting action that is a phenomenon, a hand may be set to the part of the detection object. Here, assume that the above-described five part regions are detected in advance. Any method is used as the method of detecting the part regions. For example, a method described in literature 2 below can be used.

Literature 2 . . . Shih-En Wei, Varun Ramakrishna, Takeo Kanade and Yaser Sheikh, "Convolutional Pose Machines", CVPR, 2016

Note that an example in which detection of part regions is performed after the human body region is detected has been described here. However, the present invention is not limited to this, and a process of specifying the part regions of a number of persons and then specifying human body regions may be used.

Referring back to FIG. 9, next, in step S903, the detection unit 112 extracts the part regions extracted from the human body region by the detection unit 112 in step S902 and sends the extracted part regions to the preprocessing unit 113.

Next, in step S904, the preprocessing unit 113 performs preprocessing of recognition processing. In this embodiment, processing is deforming (reducing) each human body region (image) to a predetermined image size (for example, 224 pixels×224 pixels), and subtracting an average image is performed. Here, the average image is an image obtained by setting the average value of pixel values at each pixel position (x, y) of a plurality of images in the training data to the pixel value at the pixel position (x, y) of the average image. In addition, the preprocessing unit 113 inverts the training data (training image) in the horizontal direction to pad it out and handles both the image before padding and the image after padding as a training image.

Next, in step S905, a data selection unit 114 creates a subset group (Minibatch set) of the training data. A Minibatch is a set of training data used when repetitively optimizing the parameters of the first CNN and the second CNN by stochastic gradient descent (SGD). In this embodiment, an example in which SGD is used as a method of optimizing the parameters of a CNN or the like will be described, as will be described later in detail. Note that in this embodiment, the size of a Minibatch is, for example, the size of a group of 50 training images having the same label of supervisory data. Additionally, a Minibatch is created such that the training data belong without repetition, and all training data are included.

Next, in step S906, the data selection unit 114 selects one Minibatch at random from the Minibatch set and sends it to the recognition unit 12 and the detail recognition device 20. The Minibatch selected at this time is a Minibatch that is not used yet in Iteration of the training. Here, Iteration is generally called epoch and represents how many times all Minibatches in the Minibatch set are learned.

Next, in step S907, the data selection unit 114 performs an end check of training processing. Various criteria can be used as the criterion for the end check of the training processing. For example, when Iteration is 50 or more, the training processing may end. If the end condition of the training processing is not satisfied, the process returns to step S906. If the end condition of the training processing is satisfied, the processing according to the flowchart of FIG. 9 ends.

Figure 12:
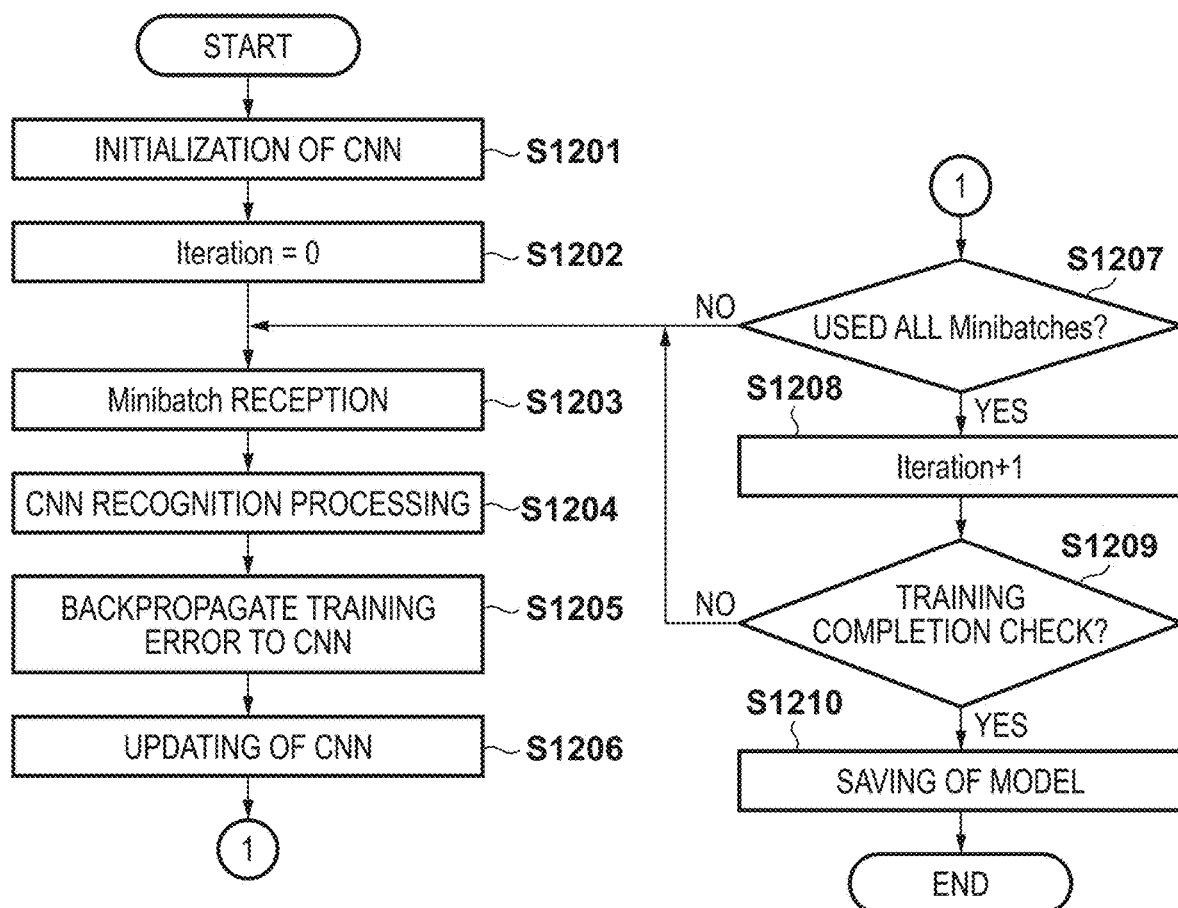
FIG. 12 is a flowchart of processing performed by the recognition unit 12.
Figure 13:
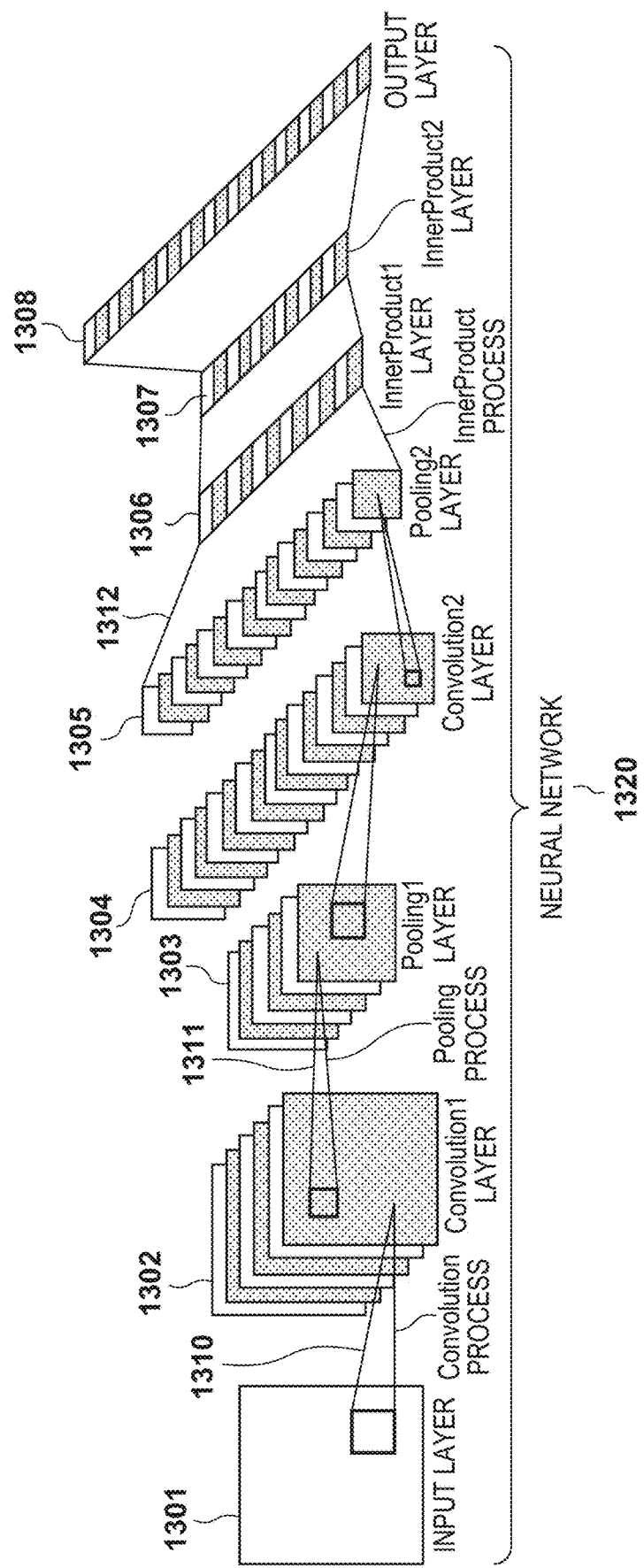
FIG. 13 is a view showing an example of a CNN.

The operation of the recognition unit 12 (FIG. 11) at the time of training will be described next with reference to the flowchart of FIG. 12. In step S1201, an initialization unit 121 initializes the parameters (the connection load and the bias term) of the first CNN. For the initialization, the network structure of the first CNN needs to be decided in advance. The network structure and the initial parameters used here are not limited to specific parameters. For example, the same parameters as in literature 3 to be described below may be used, or a uniquely defined network structure may be used. FIG. 13 shows an example of a CNN applicable to this embodiment.

Literature 3 . . . A. Krizhevsky et al. "ImageNet Classification with Deep Convolutional Neural Networks", Advances in Neural Information Processing Systems 25 (NIPS), 2012

A neural network 1320 shown in FIG. 13 represents an example of the network structure of the first CNN according to this embodiment. As shown in FIG. 13, the neural network 1320 includes an input layer 1301, a convolution 1 layer 1302, a pooling 1 layer 1303, a convolution 2 layer 1304, a pooling 2 layer 1305, an Inner Product 1 layer 1306, an Inner Product 2 layer 1307, and an output layer 1308. In addition, as the processing method between two layers, a convolution process 1310, a pooling process 1311, and an Inner Product process 1312 are set. The detailed contents of each process are known and are the same as in, for example, literature 3 described above, and a description thereof will be omitted here.

In the convolution process 1310, data processing is executed using a convolution filter. In the pooling process 1311, if the process is, for example, max pooling, processing of outputting a local maximum value is performed. Additionally, in the Inner Product process 1312, Inner Product processing is executed.

Here, the convolution filter is defined by the distribution of connection loads (connection weight coefficients) each corresponding to the receptive field of each neuron after training. Additionally, in FIG. 13, in each of the convolution layers and the pooling layers, a plurality of feature maps (intermediate layer feature maps) exist. A plurality of neurons exist at a position corresponding to a pixel on the image in the input layer. For example, when the training image has the RGB format, three neurons corresponding to RGB channels exist. If the image is an Optical Flow image with the motion information of the captured video, there exist two types of neurons that express the horizontal axis direction and the vertical axis direction of the image, respectively. In addition, when a plurality of images are simultaneously used as inputs, this can be coped with by increasing the number of neurons of the input layer as many as the number of input images. In this embodiment, an example in which a standard RGB image is used as an object will be described.

Note that there are variations regarding the initialization method in step S1201 described above. The initialization unit 121 can initialize the parameters of the first CNN by a known method. The variations of the initialization method are roughly classified into initialization using data and initialization without using data. Here, as a simple method of performing initialization without using data, the weight parameter is initialized using a value sampled at random from a normal distribution with mean 0 and variance 1, and the bias term parameter is initialized wholly by 0. Note that when performing initialization using data, the first CNN trained in advance (pre-trained) for the purpose of, for example, image recognition may be used as the initial model (initialized connection weight parameter and the like) of the first CNN according to this embodiment. Then, the initialization unit 121 sends the model of the first CNN initialized in the above-described way to an execution unit 122.

Next, in step S1202, the execution unit 122 initializes the value of a variable Iteration to 0. Next, in step S1203, the execution unit 122 acquires a Minibatch for training for the preprocessing unit 11.

Next, in step S1204, the execution unit 122 executes recognition processing of the first CNN. At this time, processing for performing recognition of the first CNN and recognition of the second CNN cooperatively is executed (details will be described later).

Next, in step S1205, based on the recognition processing result obtained in step S1204, a CNN updating unit 123 propagates a recognition error and error information to perform processing for updating the model of the first CNN. In this embodiment, as a method of training the first CNN, a method combining back propagation and SGD is used. The method combining back propagation and SGD is known. In this method, as described in, for example, literature 3 above, a procedure of selecting a Minibatch and sequentially updating the parameters of the first CNN is repeated.

Note that error information generally propagates in a direction reverse to the data flow in the recognition processing. Even here, the error information propagates to the second CNN. In this embodiment, note that the data flow for the back propagation processing can dynamically change. This will be described later in detail.

Next, in step S1206, the CNN updating unit 123 updates the first CNN using the error information propagated in step S1205. Next, in step S1207, the execution unit 122 checks whether all Minibatches are used for training. If all Minibatches are used for training, the process advances to step S1208. If a Minibatch that is not used yet for training remains, the process returns to step S1203.

In step S1208, the execution unit 122 increments the value of the variable Iteration by one. In step S1209, the execution unit 122 checks whether the value of the variable Iteration (Iteration count) has reached a preset upper limit value. As the result of the check, if the Iteration count has reached the preset upper limit value, the training of the first CNN ends, and the process advances to step S1210. On the other hand, if the Iteration count has not reached the preset upper limit value, the process returns to step S1203.

Note that in many cases, one of "Iteration count has reached the preset upper limit value" and a condition automatically decided using the gradient of a training curve is employed as the stop condition of the training of the NN. In this embodiment, "Iteration count has reached the preset upper limit value" is employed as the stop condition of the training. However, the present invention is not limited to this. In this embodiment, the "preset upper limit value" is "20000". However, the value is not limited to this. Note that a contrivance for the training processing based on the Iteration count, for example, a method of lowering the training rate of the NN as the Iteration count increases may be introduced.

Figure 18:
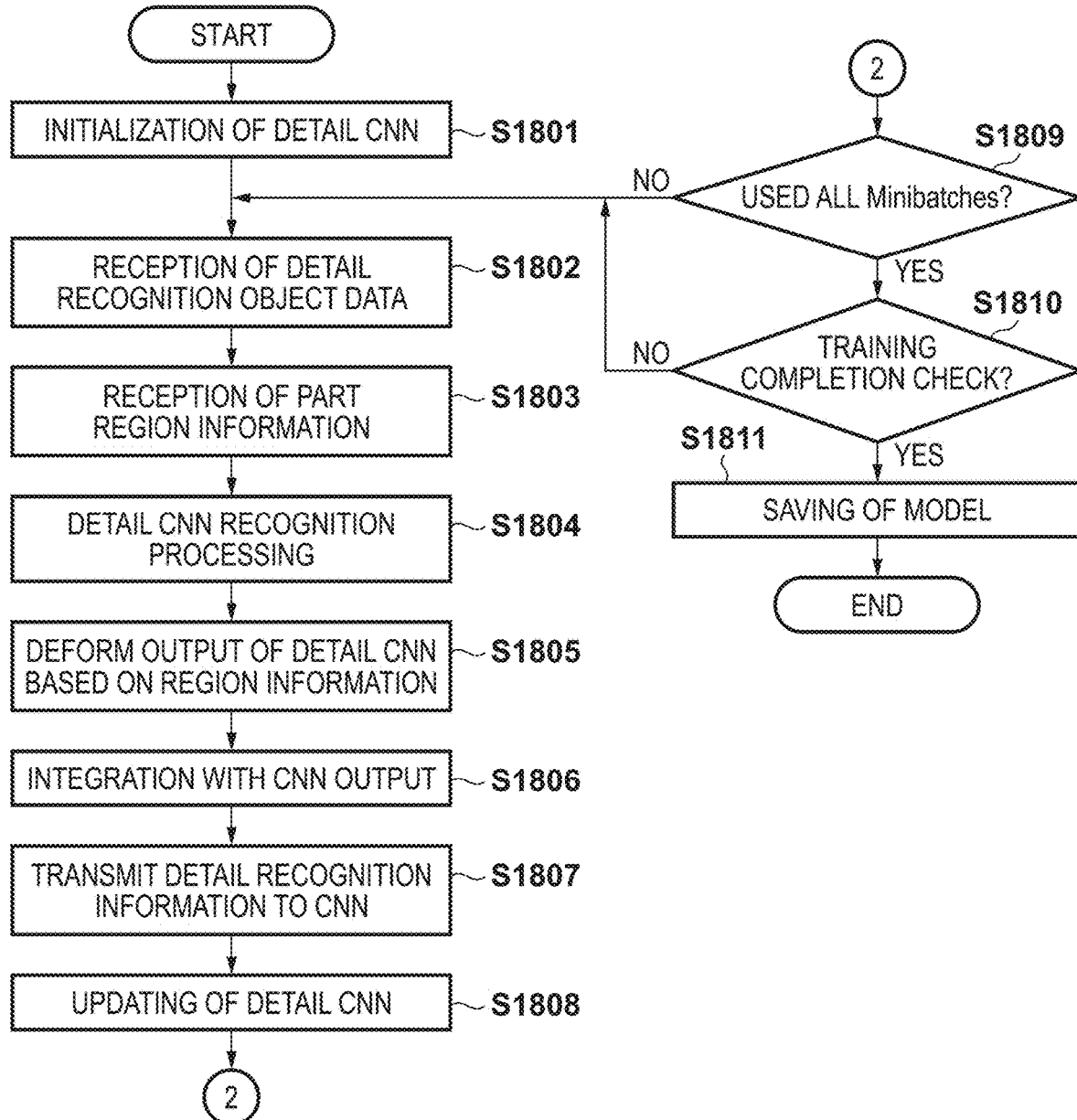
FIG. 18 is a flowchart of an operation at the time of training.

An operation at the time of training by the arrangements shown in FIGS. 14 to 17 will be described next with reference to the flowchart of FIG. 18. In step S1801, an initialization unit 221 initializes the second CNN. As the initialization method, a known method can be used. For example, the above-described CNN initialization method may be used. The model initialized here is sent to an operation unit 2221. The operation unit 2221 loads the received model as the model of the second CNN provided in a stream 2223.

In step S1802, a reception unit 211 receives detail recognition object data from the data selection unit 114. The reception unit 211 further receives the intermediate layer output of the first CNN from the execution unit 122. The reception unit 211 sends the received detail recognition object data to a reception unit 2222 of the execution unit 222. The detail recognition object data sent to the reception unit 2222 undergoes recognition processing in the subsequent step.

Figure 19:
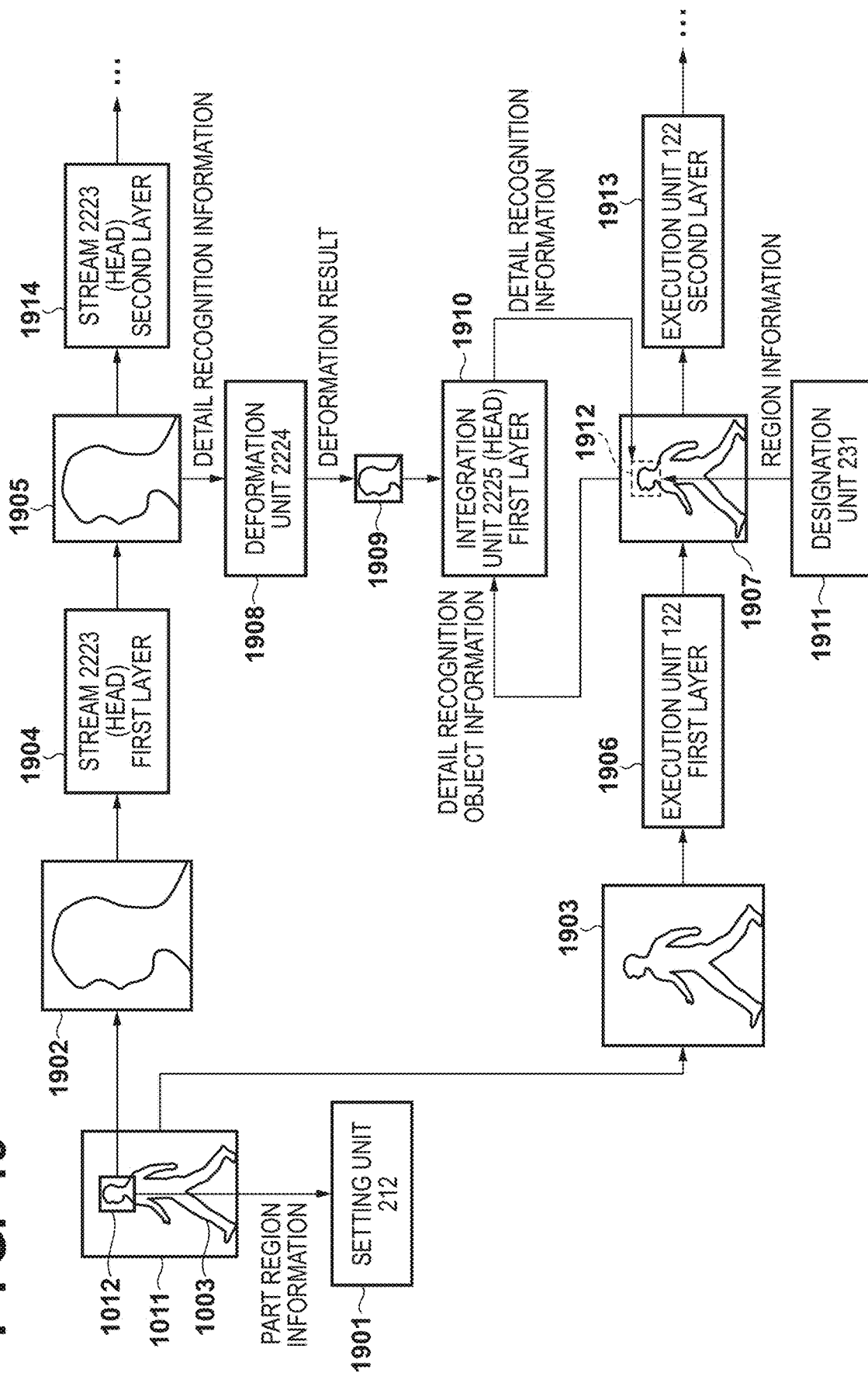
FIG. 19 is a schematic view concerning the arrangements and data flows of a first CNN and a second CNN.

In step S1803, a setting unit 212 receives region of interest information from the preprocessing unit 11. In step S1804, the reception unit 2222 sends the detail recognition object data to the stream 2223. The stream 2223 performs recognition processing using the second CNN for the received detail recognition object data. Here, to show a detailed example, FIG. 19 shows a schematic view concerning the arrangements and data flows of the first CNN and the second CNN. In the example shown in FIG. 19, to recognize the action of a recognition object person, the first CNN is assumed to have a function of recognizing an action concerning the whole body of the recognition object person, and the second CNN is assumed to have a function of recognizing a detailed feature concerning the head of the recognition object person. At this time, the second CNN is assumed to recognize an action (extract a feature amount) concerning the head based on the image of the head region of the recognition object person and the intermediate layer output concerning the whole body recognized by the first CNN. The second CNN is assumed to send the extracted detailed feature amount as a detail recognition processing result to the first CNN, and the first CNN is assumed to be configured to use the received detail recognition result as input data to perform further recognition processing. At this time, the second CNN may send the detail recognition result in consideration of the position of the head region on the feature map of the first CNN. At this time, the detail recognition result output from the second CNN is the detailed feature amount concerning the head. When the detailed feature amount is sent to the head region of the intermediate layer feature map of the first CNN concerning the whole body of the recognition object person and integrated, the intermediate layer feature map of the first CNN is expected to be detailed concerning the head. With the arrangement using the detailed feature amount, for example, a "restless eye movement" of a person can be expected to be accurately detected. Reference numerals 1003, 1011, and 1012 denote an example of the recognition object person, image data of the whole body region of the recognition object person, and image data of the head region of the recognition object person shown in FIG. 10, respectively. Reference numeral 1901 represents the setting unit 212 that receives the head image data and the position data of the head region. This process indicates the process of step S1803. Reference numeral 1902 denotes head region image data of the object for which recognition processing of the second CNN is performed; and 1903, an example of the whole body image for which recognition processing of the first CNN is performed. Reference numerals 1904 and 1914 denote convolution processes of the first layer and the second layer of the second CNN provided in the stream 2223, respectively. The image data 1902 represents an image obtained by changing the size to input the image data of the head region to the first layer of the second CNN. The image is input to the first layer of the second CNN, and a detail recognition processing result 1905 as an output result is obtained. The detail recognition processing result 1905 is input to the second layer of the second CNN, and the processing of the second CNN is similarly performed. The process of step S1804 has been described. Note that the method described here is merely an example, and the second CNN and the first CNN may cooperate using another method. Another example will be described later.

In step S1805, the stream 2223 sends the detail recognition processing result to a deformation unit 2224. The deformation unit 2224 deforms the received detail recognition processing result, thereby performing processing as a preliminary for integrating with the intermediate layer feature map of the first CNN. An example of the process of this step is represented as a step of sending the detail recognition processing result 1905 to 1908 that is the deformation unit 2224 and obtaining a deformation result 1909 in FIG. 19. At this time, there are variations regarding how the deformation is performed based on what kind of information, as will be described later.

In step S1806, an integration unit 2225 receives the deformed detail recognition processing result from the deformation unit 2224 and performs processing of integrating the detail recognition processing result as input data with the intermediate layer feature map of the first CNN. At this time, a plurality of variations regarding how the integration processing is performed can be considered, and details will be described later. An example of the process of this step is represented as the integration unit 2225 (1910 in FIG. 19) that receives the deformation result 1909 and a recognition processing result 1907 (detail recognition object data) of the first CNN and outputs a detail recognition processing result 1912 in FIG. 19.

In step S1807, a designation unit 231 receives the region of interest information from the setting unit 212. An output unit 232 transmits the detail recognition processing result to the region of interest of the first CNN designated by the designation unit 231. In this embodiment, the region of interest is the head region of the recognition object person. The size of the head region of the recognition object person on the feature map (a certain feature map of a certain layer) of the first CNN can vary, via the processing of the first CNN or the like, with respect to the size of the head of the recognition object person on the original image. For example, when the size of the head of the recognition object person on the original image is known, the size of the head expressed on the feature map of a specific layer of the first CNN can be calculated. The setting unit 212 may thus obtain the size of the region of interest of the head. The variation of the size of the region of interest of the head obtained here is absorbed by the above-described deformation processing (the size of the detail recognition processing result on the feature map is resized to the size of the region of interest at the time). In addition, the position of the head region of the recognition object person can vary depending on the posture of the person or the like. The variation concerning the position is absorbed by designating the position of the head region by the setting unit 212. The above-described variations can occur when the head region of the recognition object person changes moment by moment. The above description shows that a part of the structure of the neural network can change moment by moment to absorb the variations. For example, the variation of the region of the transmission destination of the detail recognition processing result caused by the change of the position of the head region, can be implemented when the connection destination of the neural network (the connection relationship between the neurons) dynamically changes. The arrangement for dynamically changing the connection destination of the neural network (the connection relationship between the neurons) may be implemented by software or may be implemented by hardware.

For example, in a model VGG16 used in literature 6 to be cited below, the size of the feature map of each layer is determined for each component of the layer (an example according to an interpretation that the component of a layer changes when a pooling layer is inserted is shown here). More specifically, in the components of the first to fifth layers, the feature maps have sizes of 224×224, 112×112, 56×56, 28×28, and 14×14. In addition, the input image size is 224×224. Hence, the ratios of the feature map sizes of the layers to the size of the input image are determined as 1, 0.5, 0.25, 0.125, and 0.0625. For example, the size of the region of interest on a certain feature map may be decided based on the ratio.

For example, when the arrangement is implemented by software, the integration unit 2225 (1910 in FIG. 19) may change the transmission destination of the detail recognition processing result, as described above. In this case, when transmitting/receiving data between neurons stored on the same memory at the time of, for example, recognition, it is possible to change the pointer for deciding the transmission/reception destination and designate a neuron that becomes a new transmission/reception destination. At the time of updating the model, the pointer used in recognition may be stored, and a data flow to propagate an error when applying back propagation may be decided. The connection between the neurons may be changed by a method using another known software.

When the arrangement is implemented by hardware, the connection between the neurons may be changed by changing the data transmission/reception between communication devices via, for example, the Internet. For example, assume that the model of the neural network exists while being distributed to a plurality of devices. The change of the transmission/reception destination of data between the neurons can be implemented by changing the address of the device of the transmission/reception destination by the integration unit 2225 (1910 in FIG. 19) at the time of recognition. The connection between the neurons may be changed by a method using another known hardware.

In addition, the connection between the neurons may be changed using a combination of the above-described implementations of hardware/software. Furthermore, the processing of changing the transmission destination of the detail recognition processing result can be implemented by changing the connection weight in the neural network and changing the active state. More specifically, assume that the connection weight between the neurons exists for the candidate of the transmission destination of the detail recognition processing result. The candidate of the transmission destination can also be said to be the candidate of a region in the feature map of the first CNN in which the detail recognition processing result is substituted. Whether to actually transmit the detail recognition processing result to the candidate of the transmission destination is not decided in advance. Hence, the connection weight between the neurons serving as the transmission source and the reception destination of the detail recognition processing result is 0, and the bias term also has a value of 0. Assume that the candidate of the transmission destination is selected at the time of recognition, and the transmission destination is determined. At this time, based on the determined transmission/reception relationship, the integration unit 2225 (1910 in FIG. 19) changes the connection weight between the neurons that perform transmission/reception to 1. When the connection weight is changed in this way, transfer of the detail recognition processing result can be implemented. These processes are exemplified in FIG. 19 as follows.

The detail recognition processing result sent from the layer 1910 is sent to a head region (1912) designated by the designation unit 231 represented by 1911. Here, the sent detail recognition processing result concerning the head is directly overwritten on the head region (1912) in an intermediate layer feature map 1907 of the first CNN. Note that the intermediate layer feature map of the first CNN and the detail recognition processing result output from the second CNN have the same number of dimensions of the feature amount. Finally, the intermediate layer output of the first CNN with which the detail recognition processing result is integrated is sent to the second layer (1913 in FIG. 19) of the execution unit 122. The same integration processing may be performed or may not be performed subsequently. As shown in FIG. 13, the first CNN finally outputs the recognition result. When performing the integration processing subsequently, the detail recognition processing result 1905 may be sent to the second layer (1914 in FIG. 19) of the stream 2223 (head) to obtain a further recognition result of the second CNN. When integrating the recognition results of the second CNN and the first CNN, the output of the feature map of a certain layer may be used, or the detail recognition processing result of the second CNN obtained in a deeper layer may be used. Note that the detail recognition processing result of the second CNN described here includes the intermediate layer output of each layer of the second CNN and the final layer output.

In this example, the detail recognition processing result of the second CNN and the intermediate layer output of the first CNN, which are to be integrated, are the information of the same layer. On the other hand, outputs of different layers may be used for the integration of the recognition results. For example, the detail recognition processing result of the first layer of the second CNN may be integrated with the intermediate layer feature map of the third layer of the first CNN. Alternatively, the detail recognition processing results of a plurality of different layers of the second CNN may be integrated with the intermediate layer feature map of a specific layer of the first CNN. The integration method in this case will be described later.

In step S1808, a reception unit 233 receives error information from the CNN updating unit 123. The error information received at this time is error information concerning the detail recognition processing result transmitted in step S1807 and is received based on the region of interest information used in step S1807. More specifically, of the error information of the first CNN obtained in step S1205, only error information concerning the region of the transmission destination in step S1807 is received. The reception unit 233 sends the obtained error information to an updating unit 223. The updating unit 223 calculates an error on the second CNN from the received error information based on back propagation and updates the model of the second CNN using the error information obtained here. The error information thus back-propagated to the second CNN may be propagated again to a part of the first CNN that has input the recognition object information to the second CNN, and an end-to-end training system can be formed by the first CNN and the second CNN. The model of the second CNN updated here is sent to the operation unit 2221. The operation unit 2221 sends the model to the stream 2223 and the integration unit 2225 and updates the model to be used in the recognition processing. Note that the model of the deformation unit 2224 is not updated here, assuming that the deformation unit 2224 does not use a training parameter in the deformation processing. Note that if some training parameter is used in the deformation processing, the model of the deformation unit 2224 may be updated. Note that a detailed description of the deformation processing will be made later.

When all Minibatches for training have been used, the process advances to step S1810 via step S1809. If an unused Minibatch remains, the process returns to step S1802. In the determination here, the determination result in step S1207 may directly be used.

When the training is completed, the process advances to step S1811 via step S1810. On the other hand, if the training is not completed, the process returns to step S1802. In the determination here, the determination result in step S1209 may directly be used.

In step S1811, the operation unit 2221 sends the model of the second CNN to a saving unit 224. The saving unit 224 stores the model of the second CNN received from the operation unit 2221 in the storage unit M1.

The detailed arrangement and operation of each unit concerning the training have been described above. Next, a detailed arrangement and operation of each unit concerning detection will be described next. As described above, at the time of detection, recognition processing of the first CNN and the second CNN is performed in step S701 of FIG. 7. The arrangement of each unit used here may be the same as in training. That is, not training data but detection object data may be used as input data, and the remaining portions may be shared. Note that the training processing such as updating of the model can also be selectively used as needed even at the time of detection. More specifically, in a case in which supervisory data is added to detection object data, for example, training may be performed by the same method as in training, thereby performing additional training. In a case in which supervisory data is not added to detection object data, it is impossible to calculate an error based on supervisory data and, therefore, some arrangements concerning the training processing need not always be used. In this case, the abnormality detection system may request the user to add supervisory data.

An example will be described below regarding how to set detail recognition object data. In this embodiment, an example of the arrangement for recognizing the action of a recognition object person (in particular, an action when an action "restless eye movement" is defined as an abnormality) has been described. Here, the input of the first CNN is the whole body image of the recognition object person, and the input of the second CNN is the head image of the recognition object person. Of these, setting the head of the recognition object person to the detailed feature extraction object of the second CNN corresponds to a definition "setting the detail recognition object data to the head". This definition generates a fixed one-to-one relationship "detail recognition object data=head". Note that the detail recognition object data can also be set to a part other than the head.

For example, to detect a shoplifting action, "detail recognition object data=hand that touches product" may be set. In this case, for example, the hand of the recognition object person and the touch of the hand on a product may be detected, and the region data of the hand may be used to perform detail recognition. In addition, the detail recognition object data may be designated by the user or may be defined in advance on the system.

Note that in this embodiment, as an example of the arrangement for integrating the detail recognition processing result, an example in which the detail recognition processing result of the second CNN is integrated with the intermediate layer feature map of the first CNN in consideration of the position of the head has been described. However, if necessary, the detail recognition processing result of the second CNN may be integrated with the intermediate layer feature map of the first CNN without considering the position. In this case, for example, the intermediate layer outputs of the layers of the second CNN and the first CNN may be integrated by, for example, the method of one of literatures 4 to 6 below without using the above-described deformation processing. At this time, for example, an arrangement for integrating the detail recognition result of the second CNN with the intermediate layer feature map of the first CNN can be employed.

Literature 4 . . . C. Feichtenhofer, A. Pinz, and R. P. Wildes, "Spatiotemporal Residual Networks for Video Action Recognition", Advances in Neural Information Processing Systems (NIPS), 2016

Literature 5 . . . C. Feichtenhofer, A. Pinz, and R. P. Wildes, "Spatiotemporal Multiplier Networks for Video Action Recognition", IEEE Conference on Computer Vision and Pattern Recognition (CVPR), 2017

Literature 6 . . . C. Feichtenhofer, A. Pinz, and A. Zisserman, "Convolutional Two-Stream Network Fusion for Video Action Recognition", IEEE Conference on Computer Vision and Pattern Recognition (CVPR), 2016

In addition, as a method of integrating the detail recognition processing result of the second CNN and the intermediate layer feature map of the first CNN using the position of a region of interest such as a head, a detailed example will be described below. Note that attention is needed to a point that the method to be described below is not always limited to the above-described procedure of "transmitting the detail recognition processing result output from the second CNN to a region on the feature map of the first CNN and then performing integration processing". As the first candidate, only the output of the second CNN is used. For example, expression (1) below can be substituted into the region of interest of the intermediate layer feature map of the first CNN. Note that addition may be performed in place of substitution (addition operation).

$$f_1(\text{Reshape}(A)) \tag{1}$$

where A is the intermediate layer output or final layer output (detail recognition processing result) of a certain layer of the second CNN, Reshape is a deformation processing function to be described later, and $f_1$ is a function for feature transformation for which, for example, 1×1 convolution processing may be introduced. If $f_1$ is not used, identity mapping may be used. As the second candidate, the detail recognition processing result of the second CNN and the intermediate recognition information concerning the region of interest of the first CNN are used. For example, expression (2) below can be substituted into the region of interest of the intermediate layer feature map of the first CNN.

$$f_2(\text{Reshape}(A), \text{Crop}(B)) \tag{2}$$

where B is the intermediate layer output of a certain layer of the first CNN, Crop is processing of extracting the output of the feature map of the region of interest (the region of a head part) for which, for example, ROI pooling in literature 7 below may be used, and $f_2$ is a function for feature transformation for which after Concatenate processing is performed, 1×1 convolution processing may be introduced. This makes it possible to perform recognition processing in consideration of the local intermediate layer outputs of the second CNN and the first CNN concerning the head. Note that, for example, a residual network described in literature 8 may be used as $f_2$.

Literature 7 . . . S. Ren, K. He, R. Girshick, and J. Sun, "Faster R-CNN: Towards Real-Time Object Detection with Region Proposal Networks", Advances in Neural Information Processing Systems (NIPS), 2015

Literature 8 . . . K. He, X. Zhang, S. Ren, and J. Sun, "Identity Mappings in Deep Residual Networks", ECCV, 2016

As the third candidate, all of the detail recognition processing result of the second CNN and the intermediate layer output of the first CNN are used without a limit to a partial region. For example, expression (3) below can be substituted into the intermediate layer feature map of the first CNN.

$$f_3(\text{PartialAdd}(\text{Reshape}(A),B)) \tag{3}$$

Note that the arrangement for performing substitution to the intermediate layer feature map may be implemented by software or may be implemented by hardware. This can be implemented by the method described concerning the explanation of step S1807 in FIG. 18, and a detailed description thereof will be omitted here. Here, PartialAdd is a function for adding the first argument to a partial region of the second argument and performs processing of adding the first argument to the region of interest of B, and $f_3$ is a function for feature transformation in which processing of the entire intermediate layer feature map is performed. Hence, as a characteristic feature, integration processing with the detail recognition processing result can be executed while grasping information in a wider range. As the fourth candidate, the detail recognition processing result of the second CNN is input based on the intermediate layer feature map of the first CNN. For example, expression (4) below can be substituted into the intermediate layer feature map.

$$f_5(\text{PartialAdd}(\text{Reshape}(A*\sigma(f_4(B))),B)) \tag{4}$$

Note that the arrangement for performing substitution to the intermediate layer feature map may be implemented by software or may be implemented by hardware. This can be implemented by the method described concerning the explanation of step S1807 in FIG. 18, and a detailed description thereof will be omitted here. Here, $f_4$ and $f_5$ are functions for feature transformation, σ is a sigmoid function, and * is elementwise multiplication processing. That is, the result of multiplication by A changes depending on the magnitude of the output of the function $f_4$ of B, and it is therefore possible to decide the degree of importance of information A to be handled. Note that the function $f_4$ may depend on A as well. In this case, the system controls the integration processing based on the recognition processing of the second CNN and the first CNN.

Note that in this embodiment, an example in which the detail recognition processing result of the second CNN is integrated with the intermediate layer feature map of the first CNN has been described above. However, conversely, processing of integrating the intermediate layer feature map of the first CNN with the detail recognition processing result of the second CNN, performing the processing of the second CNN based on the integration result, and after that, integrating the detail recognition processing result with the intermediate layer feature map of the first CNN may be employed.

Note that in this embodiment, an example in which the detail recognition processing result of a certain layer of the second CNN is integrated with the first CNN has been described. As another example, an arrangement for integrating the detail recognition processing results of a plurality of layers of the second CNN with the first CNN may be employed. In this case, for example, the magnitudes of the detail recognition processing results of the plurality of layers are made uniform by the already described Reshape and concatenated, and 1×1 convolution processing is performed to decrease the number of feature dimensions to the original number of dimensions. This is possible because the detail recognition processing result can thus be handled as the normal detail recognition processing result already described in this embodiment.

Note that in the deformation processing (the above-described Reshape function), for example, the size may be changed based on convolution processing. Alternatively, down-sampling processing may be performed using pooling processing used in K. Simonyan and A. Zisserman, "Two-Stream Convolutional Networks for Action Recognition in Videos", NIPS, 2014 described above.

Note that as an example in which the size of a window to perform pooling processing is decided based on a guideline that pooling evenly covering the input feature map is performed when using, for example, max pooling, the input feature map size may be divided by the output feature map size (for example, the value may be rounded by a ceiling function). In addition, based on the value decided here, the stride size of the pooling processing may be decided by an expression (input map size−window size)/(output feature map size−1) (the value may be rounded by a floor function). Note that in a case in which the output feature map size is 1 or less, when a temporary value of 2 is used, 0 division can be avoided. In addition, the size of the window is a value equal to or more than the value of the stride. If the input feature map size equals the output feature map size, the value of the stride may be set to 1.

Note that in this embodiment, an example of the first CNN that input one RGB image has been described. However, another input format may be used. For example, the first CNN may have an input layer configured to receive a plurality of images as an input, like the input layer of a Temporal Stream described in literature 9 below. Literature 9 below exemplifies a case in which an optical flow is used as an input image. This arrangement may be employed in this embodiment as well. Alternatively, the Two-Stream configuration described in literature 9 may be used. In addition, an arrangement including a recurrent neural network (RNN) such as a long-short term memory in the subsequent stage, as in literature 10, may be used. When a component having a function of processing time-series information such as a long-short term memory is used in the subsequent stage, a change in time information can be grasped. Alternatively, a known convolutional long-short term memory with a convolution layer added to an RNN such as a long-short term memory may be used. When the convolution layer is added to the long-short term memory, the position relationship of the first and second CNNs in the integration processing used in this embodiment can be taken into consideration even in the processing of the subsequent stage, and this may improve the recognition accuracy.

Literature 9 . . . K. Simonyan and A. Zisserman, "Two-Stream Convolutional Networks for Action Recognition in Videos", NIPS, 2014

Literature 10 . . . B. Singh, et al., "A Multi-Stream Bi-Directional Recurrent Neural Network for Fine-Grained Action Detection", CVPR, 2016

Figure 21:
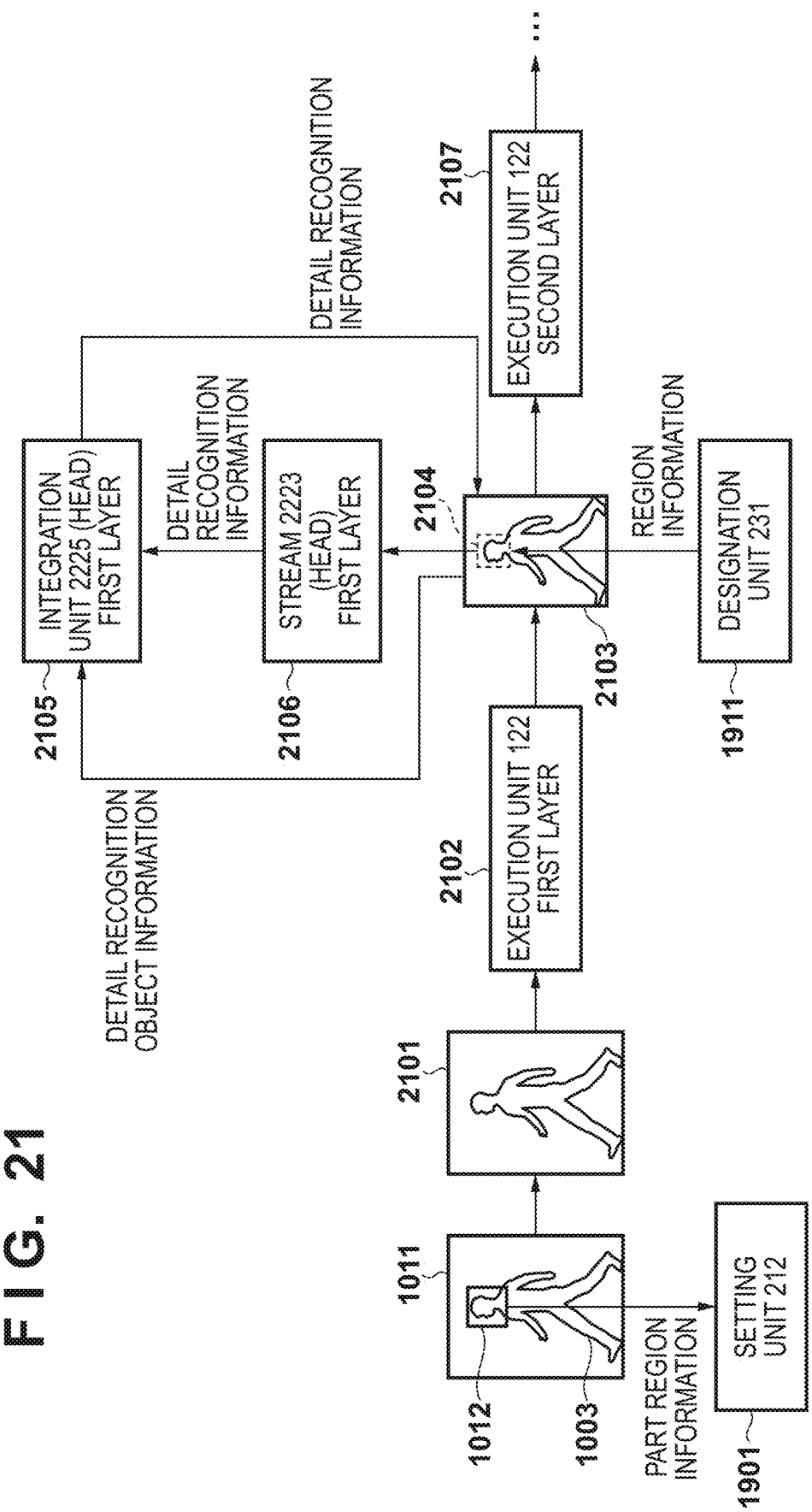
FIG. 21 is a schematic view concerning the arrangements and data flows of a first CNN and a second CNN.

Note that in this embodiment, an example of the arrangement of a multi-stream in which the first CNN and the second CNN receive different input images (already resized to an image size of 224 pixels×224 pixels), and the detail recognition processing result of the second CNN is integrated with the intermediate layer feature map of the first CNN is shown. However, not the above-described arrangement but another arrangement in which the second CNN and the first CNN cooperate may be used. For example, an arrangement in which the second CNN receives the intermediate layer output of the first CNN, an arrangement in which the second CNN does not receive an input image, and an arrangement that does not resize the input image can be considered. FIG. 21 shows an example of an arrangement having all the above-described features as an example in which such architectures are combined.

Reference numeral 2101 in FIG. 21 denotes the same as the human body region 1011 as an input image. The first CNN receives the human body region 2101 that is the same as the human body region 1011. Unlike the whole body image 1903 shown in FIG. 19, the human body region 2101 is not resized. A first layer 2102 of the execution unit 122 receives the human body region 2101, performs convolution processing or the like, and outputs it as an intermediate layer output 2103. The intermediate layer output 2103 and an intermediate layer output 2104 of the head region are sent to the second CNN. More specifically, the intermediate layer output 2104 is input as an input to the second CNN, and convolution processing or the like is performed in a first layer 2106 of the stream 2223. A detail recognition processing result as the output of the first layer and the intermediate layer output 2103 are integrated by a first layer 2105 of the integration unit 2225. Then, the processing result is overwritten as the detail recognition processing result on the intermediate layer output 2103. The result is input to a second layer 2107 of the execution unit 122, and subsequent processing is repeated. Finally, convolution processing of outputting the number of feature dimensions of the number of classes of the recognition processing object is performed. When Max pooling processing including the whole feature map is performed, and the result undergoes Softmax processing, a recognition result can be obtained. The method of the above-described integration processing, the architecture of the neural network, or the like may be changed (arbitrarily). This makes it possible to combine the second CNN and the first CNN by an arrangement different from that in FIG. 19.

Note that in this embodiment, a case in which the detail recognition processing result is integrated with the first CNN has been described as an example. However, the detail recognition processing result may be integrated with not the first CNN but another model such as a long-short term memory, a neural network, a probability model, a discriminator, or a convolutional long-short term memory. At this time, the first model may be not a CNN but another model, or may be a CNN that only partially includes another model (this also applies to the second CNN).

Figure 24:
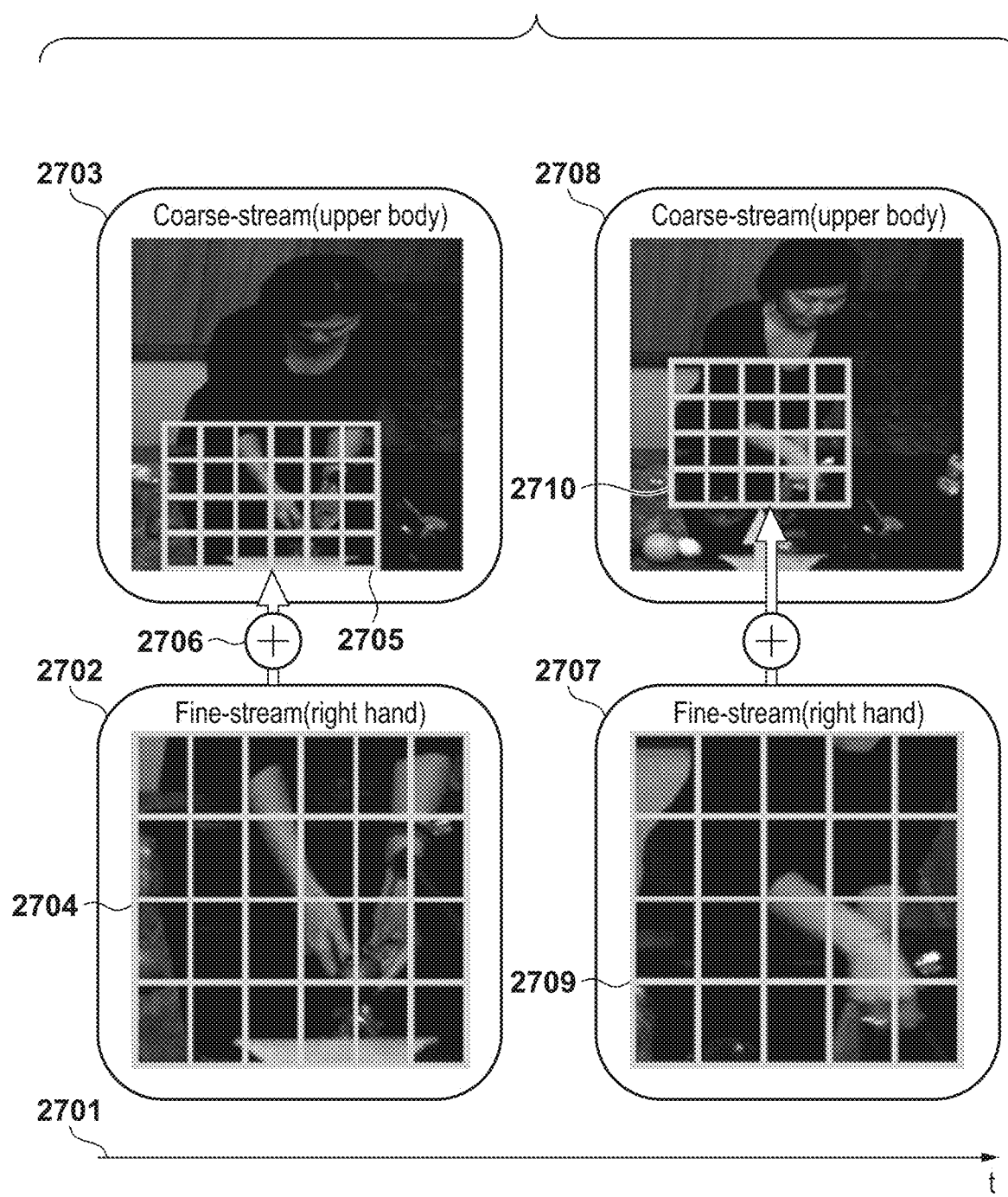
FIG. 24 is a schematic view concerning the arrangements and data flows of a first CNN and a second CNN.

Note that FIG. 24 shows an example in a case in which ROI embedding is performed in this embodiment. Reference numeral 2701 in FIG. 24 denotes a time series. Reference numerals 2702 and 2703 denote an image of a person and an image on the periphery of the right hand at a certain time, respectively, which simulatively show the intermediate layer feature maps of the first and second CNNs. Reference numeral 2704 represents an example of a pooling range when pooling the intermediate layer feature map of the second CNN. Reference numeral 2705 represents integrating the image 2702 as the region (of interest) on the periphery of the right hand of the person on the first intermediate layer feature map 2703 by integration processing 2706. Reference numerals 2707 and 2708 denote images which are the same as the images 2702 and 2703 but represent feature amounts acquired at a different timing. Reference numeral 2710 shows that the size and position of the region are different from those in the integration processing 2706. This can be coped with by changing the pooling range, as indicated by reference numeral 2709. Note that as the image represented by 2703 or the like, an image stored in a database described in literature 12 is used.

Figure 27:
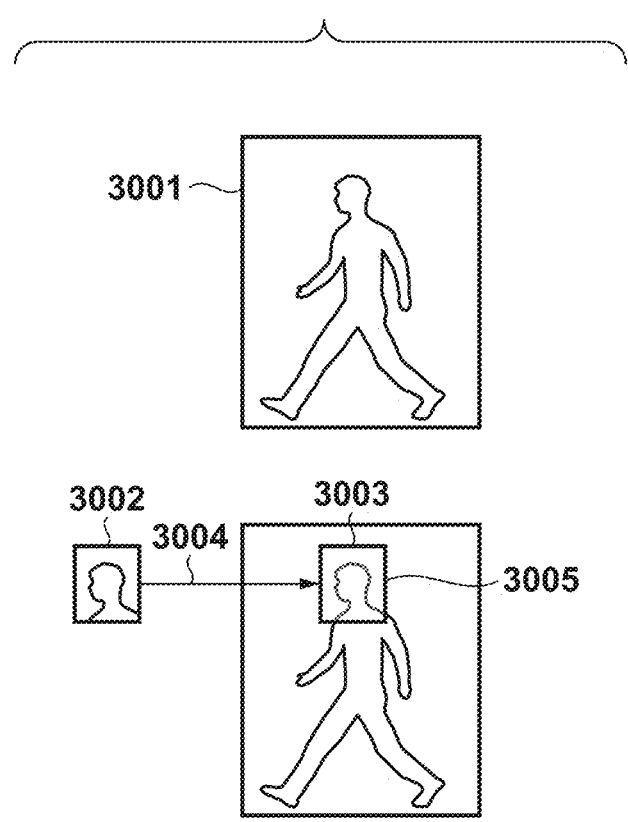
FIG. 27 is a view of an example of visualization of an intermediate processing result obtained based on the data flows of the first CNN and the second CNN.

Literature 12 . . . Marcus Rohrbach, et al., "A Database for Fine Grained Activity Detection of Cooking Activities", Computer Vision and Pattern Recognition (CVPR), 2012 IEEE Conference on Note that the effect of the integration processing shown in this embodiment, an intermediate processing result, and the like can be visualized, and may be shown as in, for example, FIG. 27. Reference numerals 3001 and 3002 denote schematic views of the intermediate layer feature maps of the first and second CNNs. Assume that there is integration processing 3004 of integrating the intermediate layer feature map 3002 with a region of interest denoted by reference numeral 3003. At this time, the degree of influence of the integration processing can be measured based on a change in a numerical value represented by, for example, the degree of activation (the magnitude of a norm or the magnitude of a numerical value) of the intermediate layer feature map (the intermediate layer feature map may be a local region or a whole region of the region 3003 of interest) or another statistic. At this time, when the above-described numerical value is shown on, for example, the map, the degree of influence can be visualized. FIG. 27 shows that the magnitude of the value of a portion 3005 increases. Note that when measuring the magnitude of the value, a feature map of a specific dimension may be used. Alternatively, a feature map obtained by performing processing such as totaling processing or the like in a dimensional direction may be used.

Note that in this embodiment, the training procedure of the first and second CNNs and the like has been described as an example. However, for example, training may be performed in accordance with the following procedure. First, the first and second CNNs are independently trained. At this time, each CNN may use, for example, the above-mentioned VGG16. Next, a layer to perform integration processing is decided, and training is performed, under an architecture formed by integrating the first CNN with the second CNN, by reusing the parameters of each CNN obtained by the preceding training processing (there can be any number of layers to perform integration processing and, for example, the result of ReLU processing of the 4_2 layer and the 5_2 layer can be used as the definition of the above-described VGG16). At this time, the training processing may be performed not only for the first and second CNNs but also for the integrated portion. Next, training of the long-short term memory is performed. For example, integration processing with the second CNN is performed in the 4_2 layer and the 5_2 layer of the first CNN described above. Concatenate processing is performed for the result.

Then, the result may be handled as a vector and used as an input to the long-short term memory.

As described above, in one form shown in this embodiment, a CNN and a detail CNN configured to recognize a recognition object person in data and a state thereof exist, and training for integrating the intermediate layer output of the CNN and the detail recognition processing result of the detail CNN is performed. Accordingly, it is possible to extract a detailed feature amount contributing to recognition and accurately recognize the recognition object, and the accuracy of the final recognition result (abnormality detection result) can improve.

Second Embodiment

In the following embodiments including this embodiment, differences from the first embodiment will be described, and the remaining points are the same as the first embodiment unless it is specifically stated otherwise. In the first embodiment, an example has been described in which a first CNN that is a CNN (Convolutional Neural Network) configured to recognize an object in data and a state thereof and a second CNN that is a CNN configured to recognize a detailed feature exist, and the intermediate recognition processing results of the CNNs are integrated based on training, thereby obtaining a recognition result. The first example of the arrangement at that time is a two-stream arrangement in which one first CNN and one second CNN exist and operate as a set. As another example, an arrangement in a case in which a plurality of sets of first CNNs and second CNNs exist has been described. As a feature of these examples, the first CNN and the second CNN in one set has a one-to-one correspondence relationship.

In this embodiment, an arrangement and operation in a case in which a plurality of second CNNs exist in correspondence with one first CNN, and the plurality of second CNNs extract different detail recognition processing results will be exemplified. At this time, concerning how to integrate the detail recognition processing results of the plurality of second CNNs, an arrangement and operation different from those of the first embodiment will be described. Note that most part of the arrangement shown in this embodiment is the same as the arrangement exemplified in the first embodiment, and the arrangement and operation are partially different. In this embodiment, the arrangement and operation are largely different from the first embodiment in that a plurality of second CNNs exist in correspondence with one first CNN, as described above.

In this embodiment, as one arrangement example, an arrangement and operation in a case in which a second CNN configured to extract a detailed feature amount of a hand is introduced in addition to the arrangement of the first embodiment will be exemplified. That is, assume that there exist a first CNN configured to recognize the whole body of a recognition object person, a second CNN (head) configured to recognize the head in detail, a second CNN (right hand) configured to recognize the right hand in detail, and a second CNN (left hand) configured to recognize the left hand in detail. When, for example, the recognition object person performs a shoplifting action, the shoplifting action can be detected relatively accurately by extracting/integrating the detailed feature amounts of the whole body, head, right hand, and left hand of the object person.

In this embodiment, as the method of extracting the whole body, head, right hand, and left hand of the recognition object person, the same method as in the first embodiment is used. Here, reference numerals 1011, 1012, 1013, and 1015 in the lower part of FIG. 10 denote regions in which the whole body, head, right hand, and left hand of the recognition object person are detected, respectively. Of these, recognition processing can be performed for the feature amounts of the whole body and head regions by the arrangement shown in FIG. 19. FIG. 19 shows an example in a case in which the first CNN and the second CNN have a one-to-one relationship. At this time, when the processes for the head region shown in FIG. 19 are replaced with those for the right hand region or the left hand region, an arrangement for performing recognition processing of "whole body and right hand region" or "whole body and left hand region" can be obtained. That is, a plurality of second CNNs are prepared, which can have functions of extracting detail recognition processing results concerning the head, right hand, the left hand. At this time, how to integrate the plurality of detail recognition processing results is important. For example, in a deformation result 1909 shown in FIG. 19, the deformation results of the detail recognition processing results concerning the head, right hand, and left hand are obtained. A function of performing integration processing of the plurality of deformation results and an intermediate layer output 1907 of the first CNN is needed. As a method of integrating these feature amounts, for example, expression (5) below can be substituted into the region of interest of the intermediate layer feature map of the first CNN as a method that does not consider the position of each part.

$$f_6(\text{Concat}(B,A,C,D)) \tag{5}$$

The arrangement for substituting the expression into the intermediate layer feature map may be implemented by software or may be implemented by hardware. This can be implemented by the method described concerning the explanation of step S1807 in FIG. 18, and a detailed description thereof will be omitted here. Here, B, A, C, and D are detail recognition processing results of the whole body, head, right hand, and left hand, Concat stands for Concatenate which is processing of integrating a plurality of inputs in a feature dimensional direction, and $f_6$ represents feature transformation processing. For example, when $f_6$ represents 1×1 convolution processing, and the number of feature dimensions is relatively small, expression (5) performs processing of dimensionally compressing the inputs B, A, C, and D. As for expression (5), when the position of each part is taken into consideration, for example, expression (6) below can be substituted into the region of interest of the intermediate feature map of the first CNN.

$$f_7(\text{Concat}(B,\text{Pad}(\text{Reshape}(A)),\text{Pad}(\text{Reshape}(C)),\text{Pad}(\text{Reshape}(D)))) \tag{6}$$

Note that the arrangement for substituting the expression into the intermediate layer feature map may be implemented by software or may be implemented by hardware. This can be implemented by the method described concerning the explanation of step S1807 in FIG. 18, and a detailed description thereof will be omitted here. Here, Pad represents 0 padding processing considering a region. That is, this processing is 0 padding processing considering the size and position of the region of each part on the feature map of the first CNN. FIG. 20 shows a detailed example of the processing.

Reference numerals 2301, 2302, and 2303 denote detail recognition processing results of the head, right hand, and left hand, respectively. Reference numerals 2311, 2312, and 2313 denote results obtained by converting the detail recognition processing results into sizes on the feature map of the first CNN of the integration destination by Reshape processing. Reference numerals 2321, 2322, and 2323 dente detail recognition processing results obtained by arranging these results at the part positions on the feature map of the first CNN of the integration destination and performing 0 padding (Pad processing) for unnecessary regions. Accordingly, detail recognition processing results considering the sizes and positions of the regions on the feature map of first CNN can be obtained. Processing of concatenating these outputs and B and performing feature transformation is represented by expression (6), where $f_7$ represents feature transformation processing.

Note that the processing considering the size and position of each part region can be introduced even when not the Concat processing but the PartialAdd processing according to the first embodiment is used. In addition, for example, another processing described in the first embodiment may be introduced, and integration processing of the plurality of detail recognition processing results may be introduced, or another method may be used. For example, expression (7) below can be substituted into the region of interest of the intermediate feature map of the first CNN.

$$f_8(\text{PartialAdd}(B,\text{Reshape}(A),\text{Reshape}(C),\text{Reshape}(D))) \quad (7)$$

Note that the arrangement for substituting the expression into the intermediate layer feature map may be implemented by software or may be implemented by hardware. This can be implemented by the method described concerning the explanation of step S1807 in FIG. 18, and a detailed description thereof will be omitted here. Basically, the result of expression (7) is substituted into the entire intermediate feature map of the first CNN. Here, PartialAdd is an integration processing function considering the position of each part described in the first embodiment, and $f_8$ represents feature transformation processing. PartialAdd in expression (7) is a PartialAdd function corresponding to a plurality of parts, unlike the first embodiment. The processing contents are basically the same as in the first embodiment, and the detailed feature amounts of the head, right hand, and left hand, which the variables A, C, and D have, are added to the region in B.

Note that for a place where a plurality of regions overlap, for example, processing of neglecting (inhibiting integration processing of) a detail recognition processing result concerning the region of a shielded part may be introduced. At this time, as a method of checking whether a part is shielded, for example, the checking may be done by acquiring and using a position concerning the depth of the part.

Note that a function of checking whether to extract each detail recognition processing result and inhibiting use of an unnecessary detail recognition processing result may be introduced. For example, a shielded part or a part for which the reliability of the detection result of the part region is low is detected, and in that case, the processing can be changed not to extract a detail recognition processing result or not to perform detail recognition processing.

Note that normalization processing may be introduced to avoid a change in the scale of a value, which is caused by integration of the intermediate layer output of the first CNN and the detail recognition processing results of the second CNNs. For example, the numbers of first CNNs and second CNNs for which the integration processing is performed may be used. More specifically, assume that a result obtained by integrating the original intermediate layer output and the detail recognition processing results of two second CNNs by addition is substituted into a certain region of the intermediate layer feature map of the first CNN. That is, the sum of three kinds of values is obtained.

Note that the arrangement for substituting the value into the intermediate layer feature map may be implemented by software or may be implemented by hardware. This can be implemented by the method described concerning the explanation of step S1807 in FIG. 18, and a detailed description thereof will be omitted here. Here, normalization may be performed by dividing the value of the region portion by 3. Alternatively, instead of explicitly using the numbers of first CNNs and second CNNs for which the integration processing is performed, normalization may be performed by, for example, using an average value. More specifically, the average value of the feature maps of the first CNN in the vertical direction or horizontal direction may be subtracted from the value of the feature map to perform centering of the value of the feature map. At this time, when a centering matrix is used, centering can easily be performed. Let mean(A, 1) be the average concerning the vertical direction of an intermediate layer feature map A, and H be the centering matrix of A. In this case, HA and AH can be obtained by $$HA = A - \text{mean}(A,1) \quad (8)$$

$$AH = A - \text{mean}(A,2) \quad (9)$$

As the normalization, one of these processes may be used, or HAH introducing both may be used. Note that the centering matrix can be obtained as $H = I - 1/n \, 1_n \, 1_n^T$, where n is the size of one side of a symmetric matrix A, I is the identify of n×n, $1_n$ is one vector of the size n, and T represents transposition processing. These equations can be differentiated and can be used for back propagation. Note that if the feature maps do not form a symmetric matrix, centering processing can similarly be used. As another normalization method, for example, a method of literature 11 below may be used, or another method may be used.

Literature 11 . . . S. Ioffe and C. Szegedy, "Batch Normalization: Accelerating Deep Network Training by Reducing Internal Covariate Shift", JMLR In the above-described arrangement as well, as described in the first embodiment, the first CNN and the plurality of second CNNs can be trained using, for example, back propagation. Note that the plurality of second CNNs may be introduced using the arrangement shown concerning FIG. 21 in the first embodiment, or the integration processing of the first CNN and the plurality of second CNNs may be performed using another arrangement.

Note that in this embodiment, an example in a case in which one first CNN exists, and a plurality of second CNNs exist has been described. However, an arrangement in which a plurality of first CNNs exist may be used. An example in this example is as follows. A stream of first CNNs using an RGB image as input data and a stream of first CNNs using a plurality of optical flows as input data may be prepared, and a plurality of second CNNs that extract detail recognition processing results concerning the first CNNs may be prepared. As another arrangement, a plurality of second CNNs may be introduced using, for example, the arrangement described in the first embodiment as a basis.

Note that in this embodiment, an example in a case in which the plurality of second CNNs are independently held has been described. However, the models of the second CNNs may be shared partially or wholly. For example, when performing general action recognition processing, the action of the right hand of the recognition object person and the action of the left hand have the same meaning, and the arrangements configured to extract features may be common to the right hand and the left hand in some cases. Hence, a common model may be used for the second CNN that extracts a detailed feature concerning the right hand of the recognition object person and the second CNN concerning the left hand. If necessary, a common model may be used for all of the plurality of second CNNs. Accordingly, the model size is expected to be largely reduced.

Note that in this embodiment, an example in a case in which the parts (the head, the hands, and the like) of the recognition object person used for detail recognition are set as the detail recognition objects in advance, and all the parts are used in recognition processing has been described. Of the detail recognition objects, a detail recognition object contributing recognition may be selected, and only the selected detail recognition object may be used in recognition processing. For example, expression (4) has a function of dynamically weighting the feature amount of the detail recognition object contributing to recognition at the time of detection. As another method, for example, selection processing may be performed at the time of training. For example, if it is possible to confirm, by cross-validation, which detail recognition processing result should be used to improve recognition processing, this may be used. In addition, the user may be caused to decide which detail recognition processing result should be used, and if necessary, the user may be caused to add a new detail recognition processing result. For example, in a use case of suspicious action detection of detecting a suspicious person, a watchman at site knows in which part of a human body a suspicious action appears. Hence, it can be considered that the watchman is caused to recommend the detail recognition object from the viewpoint concerning which part of the recognition object person should be focused. In a case in which a new detail recognition object is added in an actual operation at the time of detection, if necessary, the training processing may be performed again from the beginning, or the training processing may be performed again using the used model as an initial value. As an arrangement for detecting the new detail recognition object, if possible, the detection result in literature 2 described above may be used, or if necessary, a dedicated detector may be introduced.

Note that in this embodiment, the type of the detail recognition object is fixed. However, it may dynamically vary. For example, to recognize the state of a recognition object, the type of an object or article attached to the recognition object may be important. More specifically, assume that to recognize the attribute of a recognition object person, the type of an item that the person wears is important. However, in a case in which what kind of person will appear cannot be known in advance at the time of detection, the type of item to be observed in detail can change in accordance with the item worn by a person who appears. This corresponds to the case in which the type of detail recognition object dynamically varies. In this case, an arrangement in which a detector capable of detecting a thing that is likely be an object/article is used as a detector of the detail recognition object, and the detected detail recognition object is used in recognition processing may be used. For example, an arrangement for detecting a thing that is likely be an object/article held by the recognition object person using the method of literature 7 described above and performing detail recognition can be considered. At this time, an arrangement of detail recognition processing according to an approximate type of object/article can be considered such that, for example, if the detected object/article is a necklace, detail recognition processing is performed using the second CNN dedicated to a necklace. At this time, if the type of object/article is unknown, the second CNN for an article of unknown type may be used. Additionally, recognition processing can be performed using the same second CNN independently of the type of object/article.

Note that in this embodiment, as an example of performing recognition processing, processing of recognizing an abnormal action concerning a recognition object person or an example in which a general action is recognized has been described. These are merely examples, and the above-described method can also be used for a purpose of another recognition processing. For example, in a task for recognizing a scene in a still image, an arrangement in which a second CNN configured to perform detail recognition processing and a first CNN configured to perform coarse overall recognition processing are used and integrated may be used. More specifically, as in the above-described arrangement concerning the first CNN that uses the whole body image of a recognition object person as an input and the second CNN that outputs a recognition result concerning a part of the recognition object person, an arrangement in which the first CNN that uses a whole still image that is an object to recognize a scene and the second CNN that extracts a detailed feature amount of an object included in part of the whole image exist, the intermediate layer outputs and recognition processing results of the CNNs are integrated, and the scene is recognized can be considered. At this time, for example, as a method of detecting an object, the method of literature 7 described above may be used. Since the method of the detailed processes can be explained by an arrangement/operation example concerning the action recognition of the recognition object person already described in this embodiment, a description of the detailed processes will be omitted.

Figure 25:
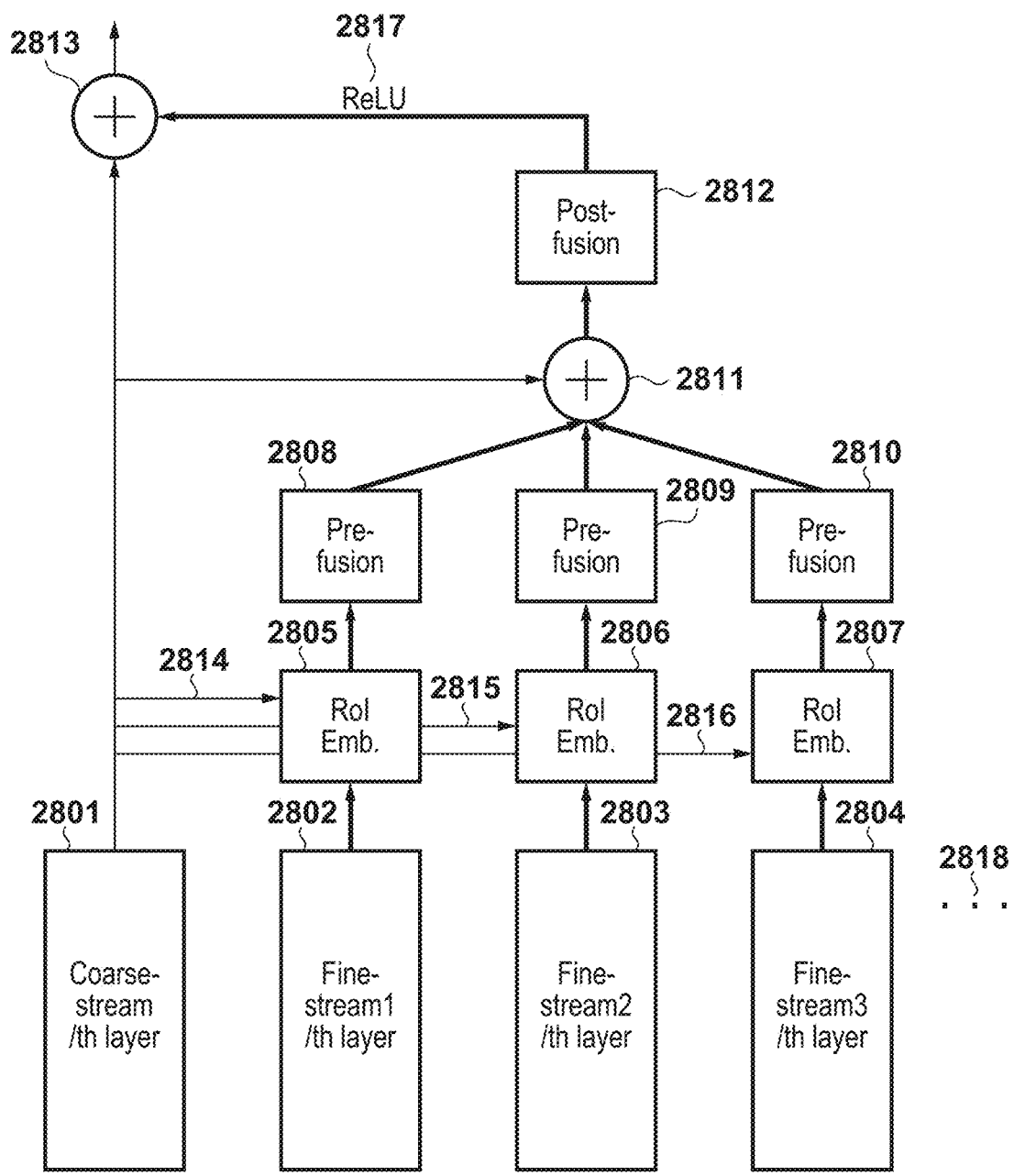
FIG. 25 is a schematic view concerning the arrangements and data flows of a first CNN and a second CNN.

Note that as an example of integration processing, FIG. 25 may be used. Reference numeral 2801 represents an example in which the l layer of the first CNN outputs an intermediate layer feature map (for example, an intermediate layer feature map after ReLU processing in the l layer); and 2802 to 2804, examples in each of which the l layer of the second CNN (the region of interest may change) outputs an intermediate layer feature map. At this time, assume that the intermediate layer feature maps of the second CNNs are integrated with the intermediate layer feature map of the first CNN. First, in 2805, the intermediate layer feature map 2801 is received (transmitted via 2814). Here, ROI embedding of the intermediate layer feature map 2802 is performed for the intermediate layer feature map 2801. Next, nonlinear processing is performed in 2808. At this time, as the nonlinear processing, a method described in literature 4 such as, for example, BN-ReLU-Conv may be used (processing may not be performed at all. For example, a case in which the output of the intermediate layer feature map 2801 is added is exemplified here. However, ROI embedding may be performed for a temporary feature map padded with 0, and nonlinear processing need not always be performed after that). 2803 and 2804 are the same as 2802, 2806 and 2807 are the same as 2805, 2809 and 2810 are the same as 2808, and 2815 and 2816 are the same as 2814. In addition, a case in which three or more second CNNs exist is assumed and indicated by 2818. These outputs (the intermediate state in the integration processing of the intermediate layer feature maps) and the intermediate layer feature map 2801 are integrated by 2811. For the integration at this time, for example, addition may be used (the number of dimensions is assumed to the same. As for a case in which the number of dimensions changes, see a separate notation). Nonlinear processing is performed for the result of addition in 2812 (an example in which nonlinear processing is performed has been described here. However, the nonlinear processing need not always be performed, and linear processing may be performed if necessary). After that, ReLU processing is performed in 2817, and the result is further added to the intermediate layer feature map 2801 in 2813 and used as the input to the next intermediate layer of the first CNN. Note that the above-described arrangement can be considered as an example in which Residual Network as shown in literature 4 is expanded to a multi-part stream.

Figure 26:
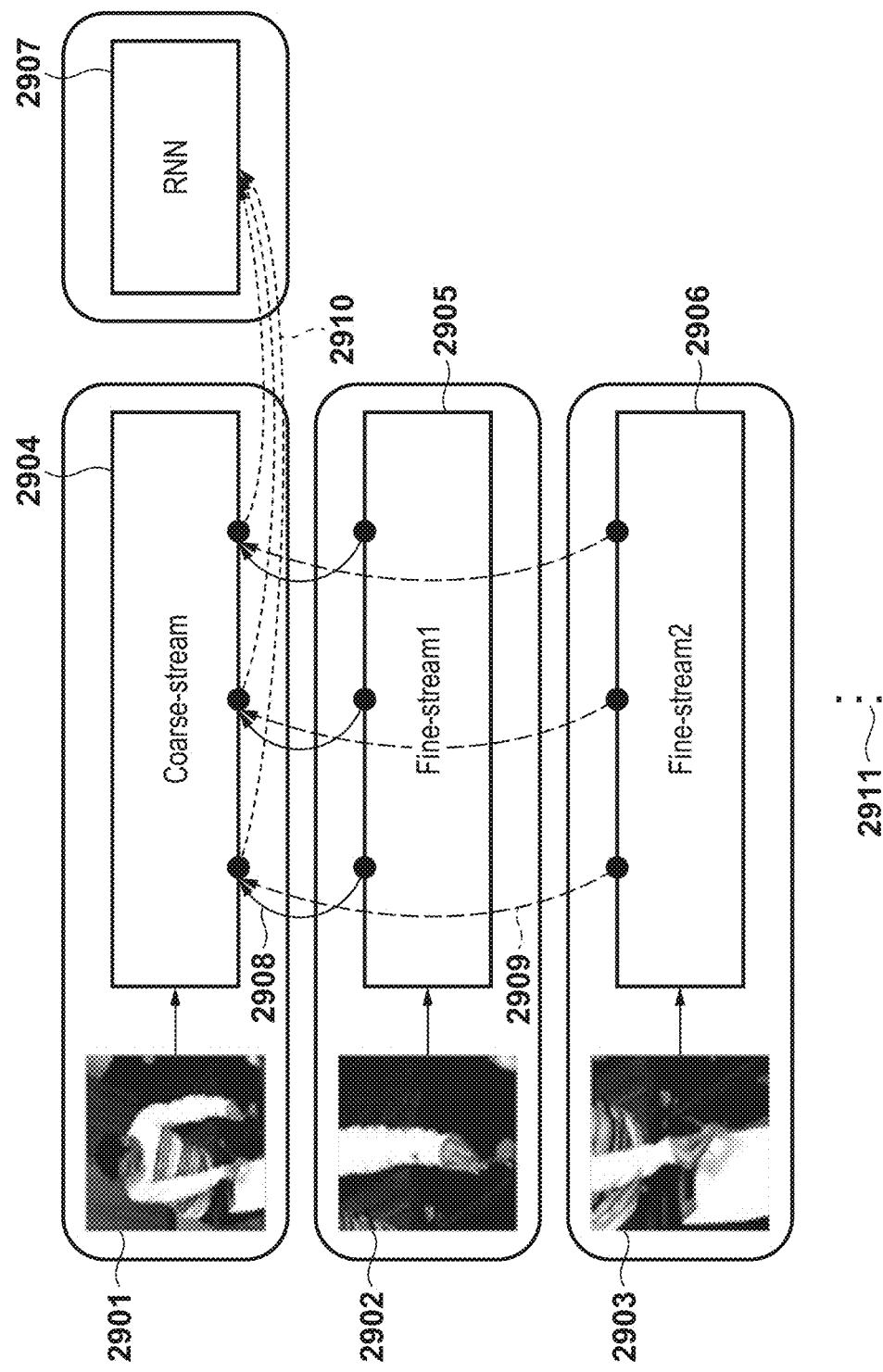
FIG. 26 is a schematic view concerning the arrangements and data flows of a first CNN, a second CNN, and a model of a subsequent stage.

Note that FIG. 26 is shown as an example of an overall integration processing architecture. Reference numerals 2901 to 2903 denote images of a recognition object person, the left hand of the person, and the right hand of the person, respectively, which are input to a first CNN 2904 (whole body), a second CNN 2905 (left hand), and a second CNN 2906 (right hand), respectively. At this time, the intermediate layer feature map of the CNN stream (left hand) is sent to the integration processing unit of the intermediate layer of the first CNN (whole body) by 2908 and thus integrated. In addition, the intermediate layer feature map of the second CNN stream (right hand) is similarly sent to the first CNN by 2905 and thus integrated. FIG. 26 shows that such processing can be performed in a plurality of layers. These integration results are sent to an RNN 2907 by 2910. The RNN may be another known model such as long-short term memory. When the RNN is introduced, the architecture of this embodiment can be expanded in a longer time direction. Note that reference numeral 2911 represents that more second CNN streams may exist.

Figure 28:
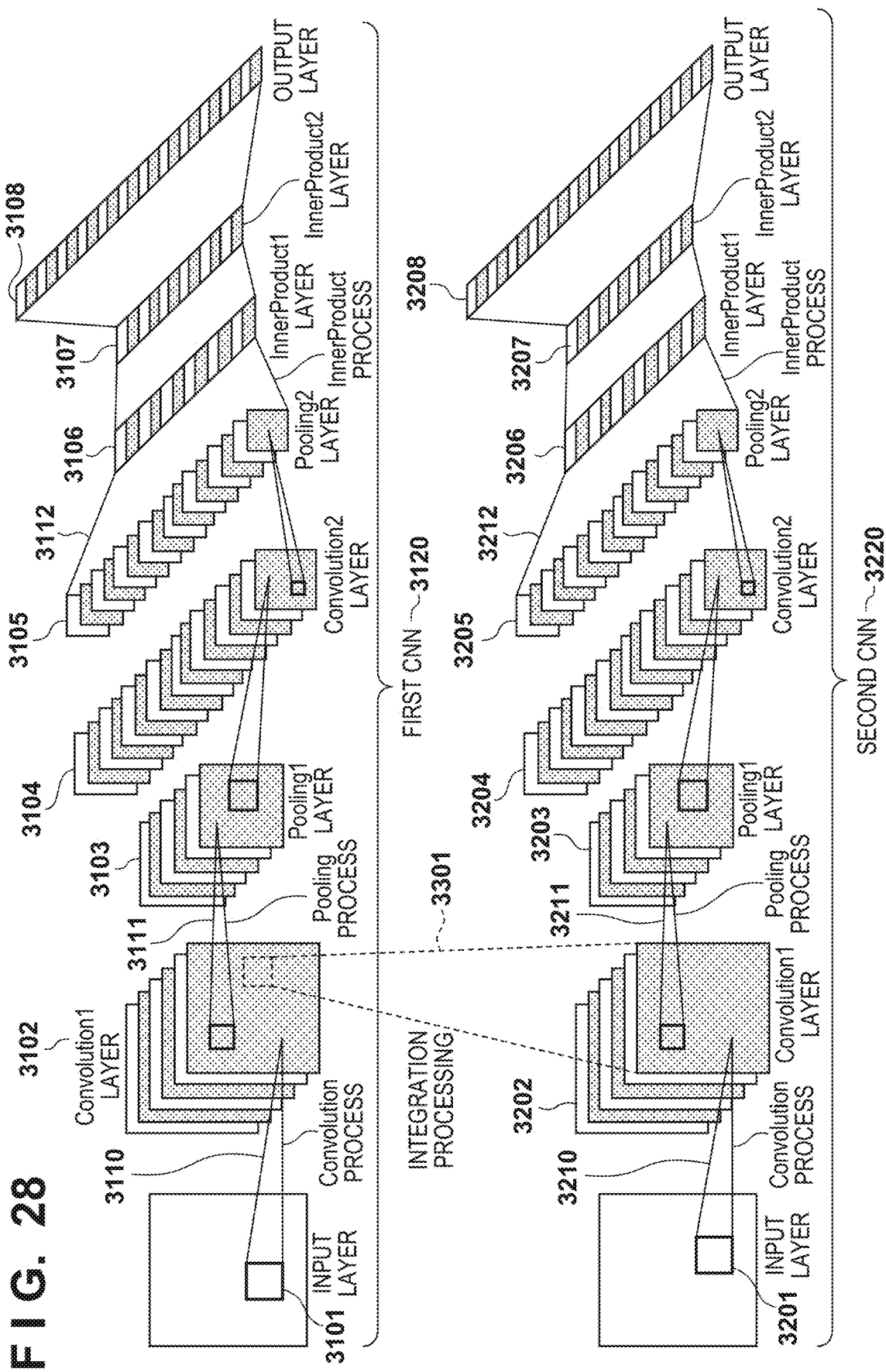
FIG. 28 is a schematic view concerning the arrangements and data flows of a first CNN and a second CNN.

Note that FIG. 28 is shown as an example of the overall integration processing architecture. A first CNN 3120 shown in FIG. 28 shows an example of the network structure of the first CNN according to this embodiment. As shown in FIG. 28, the first CNN 3120 includes an input layer 3101, a convolution 1 layer 3102, a pooling 1 layer 3103, a convolution 2 layer 3104, a pooling 2 layer 3105, an Inner Product 1 layer 3106, an Inner Product 2 layer 3107, and an output layer 3108. In addition, as the processing method between two layers, a convolution process 3110, a pooling process 3111, and an Inner Product process 3112 are set. The detailed contents of each process are known and are the same as in, for example, FIG. 13, and a description thereof will be omitted here. The arrangement of a second CNN 3220 is the same as that of the first CNN here (may be different), and 3202 to 3212 correspond to 3102 to 3112, respectively. At this time, integration processing of an example in which the output (after the convolution 1 layer 3202 is performed, or after ReLu is further performed) of the first layer of the second CNN is performed is indicated by 3301. In the example 3301, the output is transmitted from the intermediate layer feature map of the second CNN to the intermediate layer feature map of the first CNN, and integration processing is performed.

As described above, in one form shown in this embodiment, a CNN and a detail CNN configured to recognize a recognition object person in data and a state thereof exist, and training for integrating the intermediate layer output of the CNN and the recognition processing result of the detail CNN is performed. At this time, a plurality of detail CNNs exist in correspondence with one CNN, and processing of integrating a plurality of recognition processing results is performed. Accordingly, it is possible to perform recognition processing based on a plurality of detailed feature amounts to accurately recognize the recognition object, and the accuracy of the final recognition result (abnormality detection result) can improve.

Third Embodiment

In the first and second embodiments, an example in which the intermediate layer output of the first CNN and the detail recognition processing result of the second CNN are integrated, thereby performing training/recognition processing in a single object has been described.

In this embodiment, in addition to the above-described example, an example in which training/recognition processing in objects is performed using objective functions will be explained. More specifically, an example in a case in which multi-task training with different objective functions for the first CNN and the second CNN is performed at the time of training will be described.

Note that most part of the arrangement shown in this embodiment is the same as the arrangement exemplified in the first and second embodiments, and the arrangement and operation are partially different. In this embodiment, the arrangement and operation are largely different from the first and second embodiments in that the first CNN and the second CNN perform multi-task training in a certain arrangement, as described above.

In this embodiment, as one arrangement example, an arrangement and operation in a case in which multi-task training is performed in the arrangement according to the first embodiment will be exemplified. That is, assume that there exist a first CNN configured to extract the feature amount of the whole body of a recognition object person and a second CNN configured to extract a detailed feature amount of a head, and the second CNN performs training processing based on an objective function different from that of the first CNN. This enables training for performing identification processing separately for actions with different meanings in, for example, the action of the whole body and the action of the head. In addition, when processing of internally integrating feature amounts necessary for the respective tasks is performed, the accuracy of the final recognition processing can be expected to improve.

The objective functions of the first CNN that performs recognition processing of the whole body and the second CNN that performs detail recognition processing of the head are represented by $$\min \text{Loss}_{Body} = \Sigma(t_{Body} - y_{Body})^2 \quad (10)$$

$$\min \text{Loss}_{Head} = \Sigma(t_{Head} - y_{Head})^2 \quad (11)$$

where $\text{Loss}_{Body}$ and $\text{Loss}_{Head}$ are the loss function of the first CNN that performs recognition processing concerning the whole body of the recognition object person and the loss function of the second CNN that performs detail recognition processing concerning the head of the recognition object person, respectively, and $t_{Body}$, $t_{Head}$, $y_{Body}$, and $y_{Head}$ are the above-described supervisory data of the first CNN, the supervisory data of the second CNN, the recognition result of the first CNN, and the detail recognition processing result of the second CNN, respectively. Note that $\Sigma$ in equations (10) and (11) is a function of performing processing of obtaining a sum only for data included in a Minibatch and obtaining an average value. These loss functions are called mean squared errors. Note that not the mean squared error but another loss function may be used. Problems that arise at this time are what kind of supervisory data is used and how to obtain the recognition result (problems of network architecture).

The supervisory data and recognition result of the first CNN can be obtained by the method described in the first embodiment. The supervisory data and recognition result of the second CNN are not used in the first embodiment and will be described anew with reference to FIGS. 1 and 22.

Figure 22:
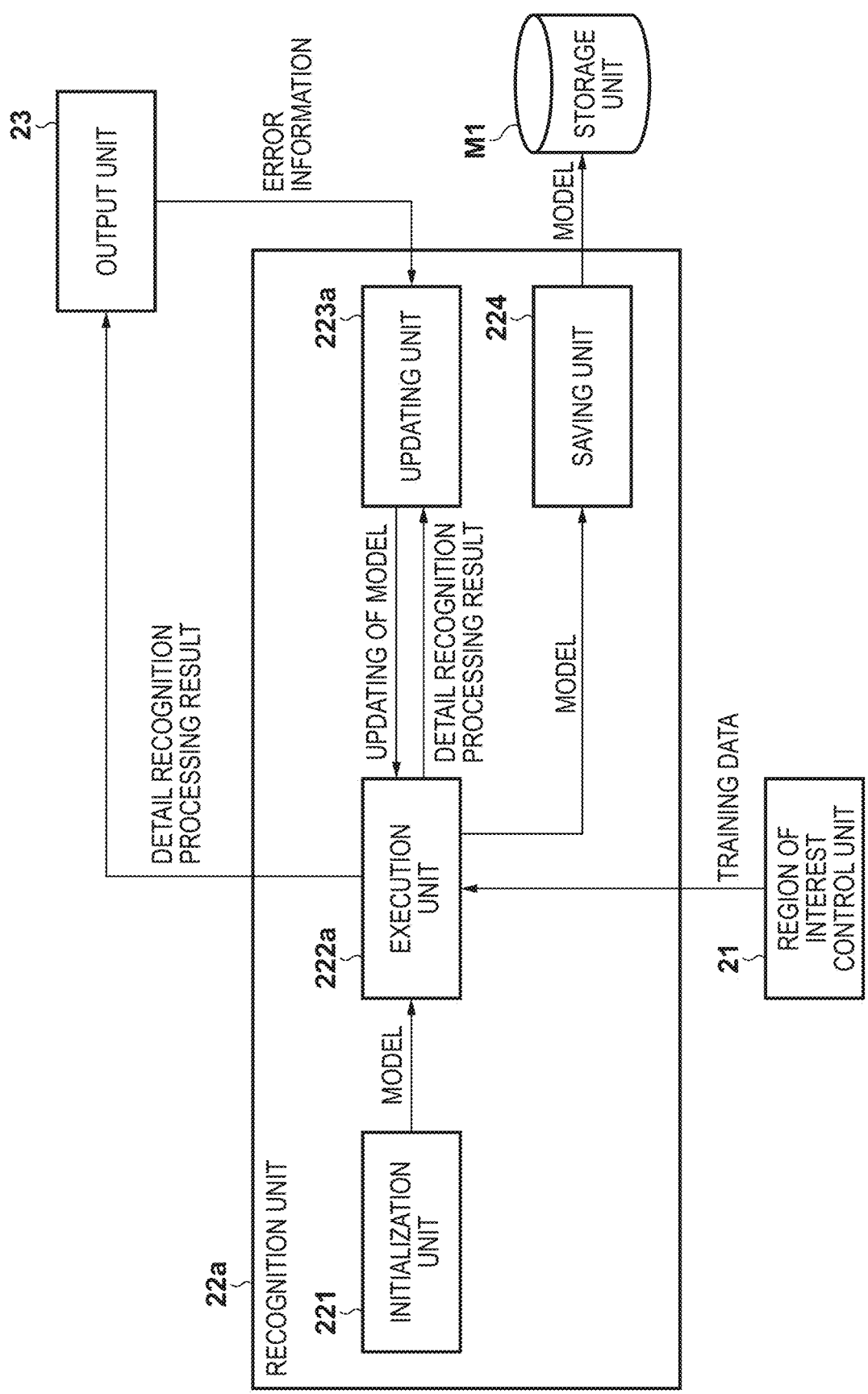

First, like the supervisory data of the first CNN, the supervisory data of the second CNN is loaded from a storage unit D1 shown in FIG. 1, transmitted from a preprocessing unit 11 to a region of interest control unit 21, and transmitted from the region of interest control unit 21 to a recognition unit 22a. Here, the recognition unit 22a is a function used in this embodiment in place of the recognition unit 22 shown in FIG. 1 used in the first embodiment, and an example of the arrangement is shown in FIG. 22.

Unlike the execution unit 222, an execution unit 222a sends a detail recognition processing result (detailed example: the estimation result of a label) for input data sent from the region of interest control unit 21 and the supervisory data of the second CNN to an updating unit 223a. The updating unit 223a calculates an error using the received detail recognition processing result and the supervisory data of the second CNN. As the error calculation method used here, the method shown in the first embodiment may be used, or the method exemplified by equation (11) may be used. Error information obtained by the error calculation method can be used for training by the method described in the first embodiment.

If the two types of supervisory data of equations (10) and (11) are completely identical, equations (10) and (11) are not different objective functions but two objective functions having the same object. Training processing may be performed in this way. In this embodiment, however, as described above, to explain a case in which the CNNs have different objective functions, a description will be made assuming that the two types of supervisory data can have different values. For example, the first CNN checks whether the state of the recognition object person is suspicious, and the second CNN checks whether the recognition object person makes an action of "restless eye movement". At this time, equations (10) and (11) evaluate the recognition results under different objects. However, the "suspicious action" and the "action of restless eye movement" can be considered as states having a relatively high correlation. That is, multi-task training based on equations (10) and (11) can provide a mechanism configured to extract a feature commonly useful for two objects.

Note that the training processing may be performed using not only the above-described set of supervisory data but also other supervisory data. What kind of supervisory data set is to be used depends on the problem to be solved, and may appropriately be changed in accordance with the purpose of detection.

As a network architecture forming method for multi-task training, for example, the following method may be used. The upper part of FIG. 19 shows an example of an arrangement associated with the stream of the second CNN concerning the head, and the lower part shows the stream of the first CNN concerning the whole body. At this time, assume that the output of the stream of the upper part is evaluated based on equation (11), and the output of the stream of the lower part is evaluated based on equation (10). In this case, the first CNN and the second CNN use different objective functions of equations (10) and (11), that is, an arrangement capable of performing an operation of multi-task training is formed. Note that at the time of detection, the outputs of the first CNN and the second CNN may be used in accordance with the purpose. More specifically, if the suspicious action of the recognition object person should be output at the time of detection, the output of the first CNN may be used. In addition, if it is necessary to output whether the "action of restless eye movement" is made, the output of the second CNN may be used. If necessary, both output results may be used. Note that the multi-task training of the first CNN and the second CNN may be performed using an arrangement example of multi-task training other than the above-described methods.

As described above, in one form shown in this embodiment, a CNN and a detail CNN configured to recognize a recognition object person in data and a state thereof exist, and training for integrating the intermediate layer output of the CNN and the recognition processing result of the detail CNN is performed. A case in which the CNN and the detail CNN (a plurality of detail CNNs) use different objective functions at this time has been described. Accordingly, it is possible to perform recognition processing based on a plurality of detailed feature amounts to accurately recognize the recognition object, and the accuracy of the final recognition result can improve.

Fourth Embodiment

The functional units shown in FIGS. 1 to 4, 8, 11, 14 to 17, and 22 may be implemented by hardware. However, some of them may be implemented by software (computer program). For example, functional units explained as storage units may be implemented by memories, and functional units other than those may be implemented by software. In the latter case, a computer device capable of executing such software can be applied to the above-described abnormality detection system.

An example of the hardware arrangement of the computer device applicable to the abnormality detection system will be described with reference to the block diagram of FIG. 23. Note that the hardware arrangement shown in FIG. 23 is merely an example of the hardware arrangement of the computer device applicable to the above-described abnormality detection system, and the arrangement may appropriately be changed.

Note that in the above-described abnormality detection system, a recognition device 10, a detail recognition device 20, a terminal device 40, and other devices such as storage units may be provided as separate devices, some of the devices may be integrated. Hence, the computer device having the arrangement shown in FIG. 23 may be applied to each or some of the recognition device 10, the detail recognition device 20, and the terminal device 40, or may be applied to a device formed by integrating some of the devices of the abnormality detection system. Note that modifications can appropriately be considered as to what kind of device is used to form the above-described abnormality detection system.

A CPU 2601 executes processing using a computer program and data stored in a RAM 2602 or a ROM 2603. The CPU 2601 thus controls the operation of the entire computer device and executes or controls each processing described above as processing to be performed by the device to which the computer device is applied.

The RAM 2602 has an area to store a computer program and data loaded from the ROM 2603 or an external storage device 2606, data received from the outside via an I/F 2607, and the like. The RAM 2602 further has a work area used by the CPU 2601 to execute various kinds of processing. In this way, the RAM 2602 can appropriately provide various kinds of areas. The ROM 2603 stores a computer program and data such as the basic program and setting data of the computer device, which are need not be rewritten.

An operation unit 2604 is formed by a user interface such as a keyboard or a mouse, and the user can input various kinds of instructions to the CPU 2601 by operating the operation unit 2604.

A display unit 2605 is formed by a CRT or a liquid crystal screen, and can display the processing result of the CPU 2601 by an image or characters. Note that the operation unit 2604 and the display unit 2605 may be integrated to form a touch panel screen.

The external storage device 2606 is a mass information storage device such as a hard disk drive. An OS (Operating System) and computer programs and data configured to cause the CPU 2601 to execute each processing described above as processing to be performed by the device to which the computer device is applied are saved in the external storage device 2606. The computer programs saved in the external storage device 2606 include computer programs configured to cause the CPU 2601 to execute the functions of the functional units of the device to which the computer device is applied. In addition, the data saved in the external storage device 2606 include data described as known information (parameters, thresholds, functions, and the like) in the above explanation. The computer programs and data saved in the external storage device 2606 are appropriately loaded into the RAM 2602 under the control of the CPU 2601 and processed by the CPU 2601.

The I/F 2607 functions as an interface configured to perform data communication with an external device. All the CPU 2601, the RAM 2602, the ROM 2603, the operation unit 2604, the display unit 2605, the external storage device 2606, and the I/F 2607 are connected to a bus 2608.

Note that some or all of the above-described embodiments may appropriately be combined, or some or all of the above-described embodiments may selectively be used. In addition, the numerical values, arrangements, and processing orders used in the above description are merely examples used for the descriptive convenience, and they are not limited to those described above.

Note that the above-described abnormality detection system has been described as an example of an information processing apparatus having an arrangement with the following units.

A recognition processing unit configured to acquire a result of recognition processing of a convolutional neural network using recognition object data including information of a recognition object as an input A region of interest setting unit configured to set a region of interest for the recognition object data and/or an intermediate layer output of the convolutional neural network A detail recognition unit configured to perform detail recognition processing more detailed than the recognition processing for the recognition object data and/or the intermediate layer output in the region of interest An integration processing unit configured to perform integration processing of a result of the detail recognition processing and the intermediate layer output An intermediate input processing unit configured to input a result of the integration processing as the intermediate layer output to the convolutional neural network An output unit configured to output a result of the recognition processing In addition, the above-described abnormality detection system has been described as an example of an information processing apparatus having an arrangement with the following units.

A recognition processing unit configured to acquire a result of recognition processing of a convolutional neural network using training data including information of a training object as an input A region of interest setting unit configured to set a region of interest for the training data and/or an intermediate layer output of the convolutional neural network A detail recognition unit configured to perform detail recognition processing more detailed than the recognition processing for the training data and/or the intermediate layer output in the region of interest An integration processing unit configured to perform integration processing of a result of the detail recognition processing and the intermediate layer output An intermediate input processing unit configured to input a result of the integration processing as the intermediate layer output to the convolutional neural network A learning unit configured to perform training processing concerning at least one of the recognition processing unit, the region of interest setting unit, the detail recognition unit, the integration processing unit, and the intermediate input processing unit Other Embodiments Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-223929, filed Nov. 21, 2017, which is hereby incorporated by reference herein in its entirety.

What is claimed is:

1. An information processing apparatus comprising:
one or more processors; and
one or more memories coupled to the one or more processors, the one or more memories having stored thereon instructions which, when executed by the one or more processors, cause the apparatus to:
perform first recognition in which an intermediate layer output of a first neural network which recognizes an action concerning a whole of a human body is obtained;
set a region corresponding to specific parts of the human body in an image;
perform second recognition in which, by using the intermediate layer output of the first neural network for a second neural network which outputs features of the specific parts of the human body, the features of the specific parts of the human body output from the second neural network is obtained, wherein the features of the specific parts of the human body output from the second neural network is a movement of the specific parts of the human body;
perform integration by incorporating the features of the specific parts of the human body output from the second neural network into the region corresponding to the specific parts in an intermediate layer output of the first neural network;
output the action concerning the whole of the human body based on a result of the integration; and
detect an abnormal state concerning one of the human body and a phenomenon included in the whole of the human body.

2. The apparatus according to claim 1, wherein a recognizer included in the second recognition is the first neural network.

3. The apparatus according to claim 1, wherein the second recognition comprises at least two recognizers.

4. The apparatus according to claim 1, wherein the one or more processors execute the instructions to:
set the region corresponding to the specific parts based on the body parts of the human body, and
the second recognition comprises a recognizer for each type of the specific part.

5. The apparatus according to claim 4, wherein the second recognition is performed using a plurality of the second neural networks, and each of the plurality of second neural networks corresponds to each of the body parts of the human body.

6. The apparatus according to claim 4, wherein the whole of the human body is included in the image, and
the integration is performed based on positions of a plurality of body parts in the image.

7. The apparatus according to claim 4, wherein the body part is dynamically decided based on a detection result of a detector configured to detect a body part of the human body.

8. The apparatus according to claim 1, wherein the region of the specific parts includes at least a region decided based on a detection result of a detector configured to detect a position of a part of a human body.

9. The apparatus according to claim 1, wherein the region of the specific parts includes at least a region decided based on a detection result of a detector configured to detect a position of a human body.

10. The apparatus according to claim 1, wherein the integration processing includes at least an addition operation.

11. The apparatus according to claim 10, wherein in the addition operation, the addition operation is partially applied based on the region corresponding to the specific parts.

12. An information processing apparatus comprising:
one or more processors; and
one or more memories coupled to the one or more processors, the one or more memories having stored thereon instructions which, when executed by the one or more processors, cause the apparatus to:
perform first recognition in which an intermediate layer output of a first neural network which recognizes an action concerning a whole of a human body is obtained;
set a region corresponding to specific parts of the human body in an image;
perform second recognition in which, by uisng the intermediate layer output of the first neural network for a second neural network which outputs features of the specific parts of the human body, the features of the specific parts of the human body output from the second neural network is obtained, wherein the features of the specific parts of the human body output from the second neural network is a movement of the specific parts of the human body;
perform integration by incorporating the features of the specific parts of the human body output from the second neural network into the region corresponding to the specific parts in an intermediate layer output of the first neural network;
input a result of the integration as the output of the intermediate layer to a succeeding layer of the intermediate layer in the first neural network; and
train the first neural network and the second neural network,
wherein the trained first neural network and the second neural network are used for detecting an abnormal state concerning one of the human body and a phenomenon included in the whole of the human body.

13. The apparatus according to claim 12, wherein a recognizer included in the second recognition uses the first neural network.

14. The apparatus according to claim 12, wherein the second recognition is performed using a plurality of the second neural networks, and each of the plurality of second neural networks corresponds to each of the body parts of the human body.

15. The apparatus according to claim 12, wherein the whole of the human body is included in the image, and
the integration is performed based on positions of a plurality of body parts of the human body in the image.

16. The apparatus according to claim 12, wherein the body part is dynamically decided based on a detection result of a detector configured to detect a body part of the human body.

17. The apparatus according to claim 12, wherein the region of the specific parts includes at least a region decided based on a detection result of a detector configured to detect a position of a part of a human body.

18. The apparatus according to claim 12, wherein the region of the specific parts includes at least a region decided based on a detection result of a detector configured to detect a position of a human body.

19. An information processing method comprising:
- performing first recognition in which an intermediate layer output of a first neural network which recognizes an action concerning a whole of a human body is obtained;
- setting a region corresponding to specific parts of the human body in an image;
- performing second recognition in which, by using the intermediate layer output of the first neural network for a second neural network which outputs features of the specific parts of the human body, wherein the features of the specific parts of the human body output from the second neural network is a movement of the specific parts of the human body;
- performing integration by incorporating the features of the specific parts of the human body output from the second neural network into the region corresponding to the specific parts in an intermediate layer output of the first neural network;
- outputting the action concerning the whole of the human body based on a result of the integration; and
- detecting an abnormal state concerning one of the human body and a phenomenon included in the whole of the human body.

20. An information processing method comprising:
- performing first recognition in which an intermediate layer output of a first neural network which recognizes an action concerning a whole of a human body is obtained;
- setting a region corresponding to specific parts of the human body in an image;
- performing second recognition in which, by using the intermediate layer output of the first neural network for a second neural network which outputs features of the specific parts of the human body, the features of the specific parts of the human body output from the second neural network is obtained, wherein the features of the specific parts of the human body output from the second neural network is a movement of the specific parts of the human body;
- performing integration by incorporating the features of the specific parts of the human body output from the second neural network into the region corresponding to the specific parts in an intermediate layer output of the first neural network;
- inputting a result of the integration as the output of the intermediate layer to a succeeding layer of the intermediate layer in the first neural network; and
- training the first neural network and the second neural network,
- wherein the trained first neural network and the second neural network are used for detecting an abnormal state concerning one of the human body and a phenomenon included in the whole of the human body.

21. A non-transitory computer-readable storage medium storing a computer program for causing a computer to:
- perform first recognition in which an intermediate layer output of a first neural network which recognizes an action concerning a whole of a human body is obtained;
- set a region corresponding to specific parts of the human body in an image;
- perform second recognition in which, by using the intermediate layer output of the first neural network for a second neural network which outputs features of the specific parts of the human body, the features of the specific parts of the human body output from the second neural network is obtained, wherein the features of the specific parts of the human body output from the second neural network is a movement of the specific parts of the human body;
- perform integration by incorporating the features of the specific parts of the human body output from the second neural network into the region corresponding to the specific parts in an intermediate layer output of the first neural network;
- output the action concerning the whole of the human body based on a result of the integration; and
- detect an abnormal state concerning one of the human body and a phenomenon included in the whole of the human body.

22. A non-transitory computer-readable storage medium storing a computer program for causing a computer to:
- perform first recognition in which an intermediate layer output of a first neural network which recognizes an action concerning a whole of a human body is obtained;
- set a region corresponding to specific parts of the human body in an image;
- perform second recognition in which, by using the intermediate layer output of the first neural network for a second neural network which outputs features of the specific parts of the human body, wherein the features of the specific parts of the human body output from the second neural network is obtained, wherein the features of the specific parts of the human body output from the second neural network is a movement of the specific parts of the human body;
- perform integration by incorporating the features of the specific parts of the human body output from the second neural network into the region corresponding to the specific parts in an intermediate layer output of the first neural network;
- input a result of the integration as the output of the intermediate layer to a succeeding layer of the intermediate layer in the first neural network; and
- train the first neural network and the second neural network,
- wherein the trained first neural network and the second neural network are used for detecting an abnormal state concerning one of the human body and a phenomenon included in the whole of the human body.

* * * * *